(12) United States Patent
Bent et al.

(10) Patent No.: US 7,302,413 B1
(45) Date of Patent: Nov. 27, 2007

(54) SYSTEMS AND METHODS FOR PROVIDING LOAN MANAGEMENT FROM CASH OR DEFERRED INCOME ARRANGEMENTS

(75) Inventors: Bruce Bent, New York, NY (US); Bruce Bent, II, New York, NY (US); Mark Vernaglia, Colts Neck, NJ (US)

(73) Assignee: Reserve Management Corporation, New York, NY (US)

( * ) Notice: Subject to any disclaimer, the term of this patent is extended or adjusted under 35 U.S.C. 154(b) by 0 days.

(21) Appl. No.: 10/092,279

(22) Filed: Mar. 6, 2002

(51) Int. Cl.
*G06Q 00/40* (2006.01)

(52) U.S. Cl. ............... 705/38; 35/39; 35/43; 35/65; 364/408; 395/235

(58) Field of Classification Search .......... 705/38, 705/31, 36, 35, 42, 39, 43, 65; 364/408; 395/235
See application file for complete search history.

(56) References Cited

U.S. PATENT DOCUMENTS

| | | | | |
|---|---|---|---|---|
| 4,114,027 A | * | 9/1978 | Slater et al. | 705/43 |
| 4,194,242 A | | 3/1980 | Robbins | |
| 4,346,442 A | * | 8/1982 | Musmanno | 705/36 |
| 4,718,009 A | | 1/1988 | Cuervo | |
| 4,739,478 A | | 4/1988 | Roberts et al. | |
| 4,742,457 A | | 5/1988 | Leon et al. | |
| 4,910,676 A | | 3/1990 | Alldredge | |
| 5,025,138 A | | 6/1991 | Cuervo | |
| 5,206,803 A | * | 4/1993 | Vitagliano et al. | 705/39 |
| 5,214,579 A | * | 5/1993 | Wolfberg et al. | 705/36 |
| 5,323,315 A | | 6/1994 | Highbloom | |
| 5,689,100 A | * | 11/1997 | Carrithers et al. | 235/380 |
| 5,878,405 A | * | 3/1999 | Grant et al. | 705/39 |
| 5,884,285 A | * | 3/1999 | Atkins | 705/36 |
| 5,933,817 A | | 8/1999 | Hucal | |
| 5,950,179 A | | 9/1999 | Buchanan et al. | |
| 6,018,723 A | | 1/2000 | Siegel et al. | |
| 6,052,673 A | * | 4/2000 | Leon et al. | 705/38 |
| 6,105,007 A | * | 8/2000 | Norris | 705/38 |
| 6,112,188 A | | 8/2000 | Hartnett | |
| 6,122,625 A | * | 9/2000 | Rosen | 705/65 |
| 6,148,293 A | | 11/2000 | King | |
| 2004/0138972 A1 | | 7/2004 | Mendelsohn | |

OTHER PUBLICATIONS

Stanley L. Iezman "Operating Pension Funds In Compliance With ERISA Procedures:How to avoid a Department of Labor audit: A primer for lawyers." webpage 1999-00.*

(Continued)

*Primary Examiner*—Harish T. Dass
(74) *Attorney, Agent, or Firm*—Foley & Lardner LLP

(57) ABSTRACT

This invention includes methods and systems for providing participants in benefit plans with loans related to the participants' vested assets in the benefit plans. Administrative systems of this invention provide for loan-fund account setup and modification, manage account use, interface to established access vehicles (check, credit card, debit card, wire transfer, ACH, sweeps, ATMs, etc.), as well as to established benefit-plan management systems. Methods of this invention manage participant loans in accordance with statutes, regulations, and policies applicable in relevant jurisdictions. Overall, this invention provides participants low cost financing using tax-advantaged assets which is particularly useful to individuals without other access to alternative low cost credit.

103 Claims, 9 Drawing Sheets

OTHER PUBLICATIONS

Figure 1:
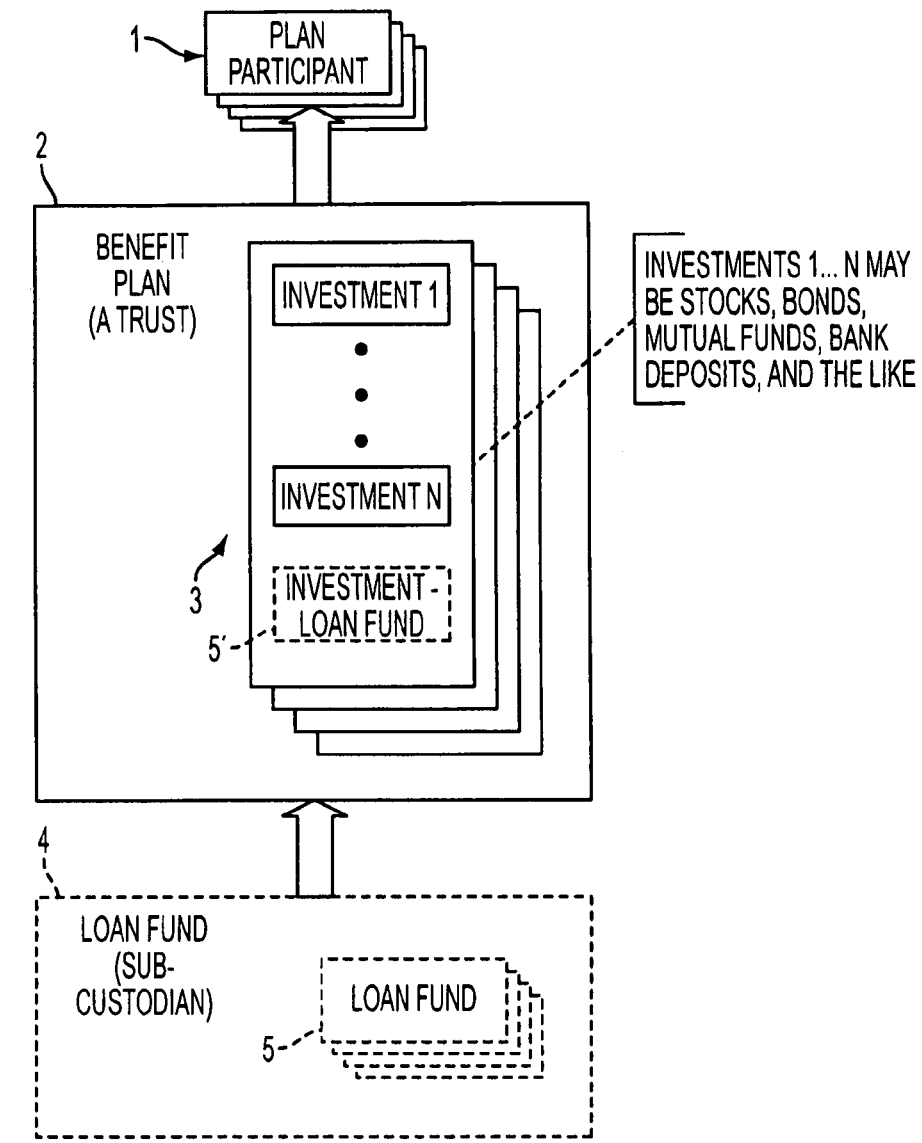

Borleis et al. (Borleis, Melvin W; Carlson, Cynthia A "Loan administration in 401K plans"; Benefits Quaterly v11 n2 pp. 67-75 second quarter 1995) total of 11 pages.*

Reserve Financial Web Site, Reserve Solutions Inc., Innovative Financial Products, Archive org Versions of equityloancard.com, 7 Sheets, (Internet Archive Wayback Machine).

Reserve Financial Web Site, Reserve Solutions Inc., Innovative Financial Products, Archive org Versions of reservesolutions.com, 14 Sheets, (Internet Archive Wayback Machine).

The TM file for Reserve Advantage Applications from PTO, Serial No. 78559556, Word Mark: Reserveadvantage Program, 20 Sheets.

The TM file for Reserveadvantage Applications from PTO, Serial No. 78444717, Word Mark: Reserveadvantage Program, 11 Sheets.

* cited by examiner

SYSTEMS AND METHODS FOR PROVIDING LOAN MANAGEMENT FROM CASH OR DEFERRED INCOME ARRANGEMENTS

1. FIELD OF THE INVENTION

The present invention generally relates to methods for providing and managing loan programs related to pension plans, or to employee-benefit plans, or to benefit plans generally. More particularly, this invention includes: processes for authorizing and establishing pension related loan funds; processes for repayment and redemption suitable for the wide variety of access vehicles (check, credit card, debit card, wire transfer, ACH, sweeps, etc.) that may be coupled to the loan programs; processes for discharging trustee responsibilities delegated by the related pension funds, such as proper regard for applicable laws, regulations, and plan policies; as well as processes for program loan repayment and for accounting for and reestablishment of such loan programs.

Preferably, the processes of the present invention are implemented by programmed computer systems in communication both with other financial management entities having a role in the loan programs and with the loan-program participants.

2. BACKGROUND OF THE INVENTION

Employee-benefit programs, including employee pension programs, have accumulated large amounts of assets, by 1994 exceeding $1.75 trillion. For many individuals of low and moderate income, their beneficial interests and assets in these benefit programs are their largest, or even their only, pool of capital and savings.

These assets have traditionally been set aside for and limited to retirement income purposes only, and have not been available to help with the vicissitudes of life, such as higher education, purchase of a residence, temporary unemployment, unexpected medical expenses, and the like. But for those of low or moderate income, who may be the most challenged by these life events, such limitations on these most significant assets can be a problem.

Fortunately, statutory and regulatory developments provide possibilities for ameliorating these asset-availability problems. Specifically, they now permit benefit plans to establish policies and procedures for making temporary loans from individually-accumulated assets to their employee beneficiaries. Theoretically, anyone who needs temporarily to tap their benefit-plan assets may now do so by applying to their benefit plan.

But benefit-plan administrators to date have typically adopted conventional paper-based procedures usually requiring an employee submission of a completed loan application for each separate loan, employer-plan approval of the loan application, and then employee signature of a note with fixed installment-based terms to repay the borrowing to the plan. Many plans also require participants with outstanding benefit-plan loans to repay the loans within a short period of time (usually 90 days) after termination of employment (not particularly convenient) or risk substantial tax consequences. For those most likely to need benefit-plan loans, this process appears time consuming at best and intrusive, unfamiliar, and intimidating at worst.

The unfortunate consequences of these traditional procedures has been, on the one hand, that individuals of low and moderate income avoid plan loans and instead rely on high interest rate credit cards for their financing needs. On the other hand, if a plan loan is used, more funds than are immediately needed are usually removed from the benefit plans, due to the difficulty of the current process and the uncertainty of a participant's financial needs at the time of loan application, which unnecessarily lowers future retirement income. In the worst case, employees eligible to participate in a retirement plan completely opt out because of the perceived lack of liquidity.

Proposals that have been made for simplifying the benefit-plan loan process have not enjoyed any commercial success thus far, principally because they have not adequately considered the current financial record-keeping systems of employee-benefit-plan providers. These current record-keeping systems are structured to interact with employers and investment managers, not with the employees who are the beneficiaries. For example, U.S. Pat. No. 5,206,803, issued Apr. 27, 1993, describes a system for providing pension-fund-backed credit to fund beneficiaries. But that system places all the burdens of processing employee credit demands and of distributing funds on the pension plan itself.

There is clearly a need for methods and systems that simplify providing of employee-benefit-plan loans while respecting the functionality of existing benefit plans, financial mechanics, methods, and systems for providing basic retirement income and other employee-benefit services.

Citation or identification of any reference in this section or any section of this application should not be construed as indicating that the reference is available as prior art to the present invention.

3. SUMMARY OF THE INVENTION

The objects of the present invention are to overcome these deficiencies in the prior art by providing methods and systems that simplify the provision of employee-benefit-plan loans while efficiently interacting with the financial mechanics, methods, and systems of existing employee-benefit services. Importantly, this invention appears to and interfaces with employee-benefit plans (and to benefit plans generally) essentially as one more investment vehicle to which the plan participant may direct parts of their assets; it assumes all responsibility for properly managing participant loans; and it further appears to and interfaces with a variety of access systems (check, credit card, debit card, wire transfer, ACH, sweeps, etc.) essentially as one more financial institution providing payment services in accustomed fashions.

Loan management provided by the invention is, first of all, properly provided according to the statutory and regulatory context of the jurisdiction of employers, regulators, and employee beneficiaries. Although the detailed description is primarily directed to embodiments for the United States, it is to be understood, and one of skill in the arts will so understand, that the present invention is not so limited. It also has embodiments that may be implemented in any jurisdiction providing, first, benefit plans for employees and others, in which at least a part of the plan assets are specifically allocated to individual plan participants and in which the individual plan participants have some discretion in the investment of their specifically allocated assets. Second, the jurisdiction must permit loans, or equivalent temporary disbursements, of part of the specifically allocated assets for current employee use, either general or limited. Additional embodiments may maintain explicit information concerning the jurisdictional management requirements so that such embodiments may service employers in more than one jurisdiction. The present invention will also meet any further statutory and regulatory requirements, such as privacy, information interchange, nondiscrimination, and the like.

In preferred U.S. embodiments, the invention's loan-management processes preserve the plan participant's tax qualifications according to the Internal Revenue Code (26 U.S.C.) (IRC), in particular according to 26 U.S.C. § 401 et seq. (qualified pension, profit-sharing, and stock bonus plans), and more particularly according to 26 U.S.C. § 401(k) (cash or deferred arrangements). Although Section 401(k) plans are particularly preferred, the present invention may interface to other similar plans (for example, 403(b) plans, 457 plans, individual retirement accounts [IRA], Keough accounts, and the like). Further, loan funding and disbursement preferably meet the requirements of 26 U.S.C. § 72 (annuities; certain proceeds of endowment and life insurance contracts) so that they avoid being deemed a taxable plan distribution. Finally, in the U.S., the invention's loan-management processes preferably meet the reporting, fiduciary, and other requirements of 29 U.S.C. § 1001 et seq. (Employee Retirement Income Security Program) (ERISA). See, Gertner, 1994, *Everything You Always Wanted To Know About ERISA*, Investment Management Consultants Association, Denver, Colo.; Dearborn Financial Publishing. Inc., 1999, *401(k) Plans 3rd Edition*, Dearborn Financial Publishing. Inc., Chicago, Ill.

Loan management is also preferably provided according to the policies and procedures that may be established by individual benefit plans. For example, a benefit plan may, by agreement, have specific policies concerning maximum loan amounts, maximum loan frequencies, maximum loan payback periods, and the like. Such specific policies may further govern employee authentication methods, data privacy, and other management processes. Accordingly, embodiments that interface with multiple benefit plans preferably maintain explicit information concerning each plan's policies and requirements so that such embodiments may service multiple plans.

Although primarily described in terms of tax-qualified-employee-benefit plans and as loans from these plans meeting the requirements for not being deemed taxable distributions, in further embodiments the invention may allow participants to convert their loans into taxable plan distributions. The invention would then determine the tax due for the participant by taking into consideration the participant's age, according to which the distribution is either an early distribution or a normal retirement distribution. Further, the systems and methods of the present invention may also be advantageously employed for loan funds related to employee-benefit plans that are not tax qualified in the first place. In such embodiments, the invention's loan-management methods need be primarily in accordance only with the plan's agreements and procedures, because meeting statutory and regulatory requirements for tax qualification at all times is unnecessary.

Finally, to realize full benefit of this invention, a jurisdiction preferably should have in place electronically implemented payment systems with interfaces that permit adding systems of this invention as a financial institution providing payment services. Preferably, this invention may include interfaces to payment systems in which individuals present access vehicles to their loan-fund account for ordering the redemption of a specified sum to a specified payee. These access vehicles include checks, credit cards, debit cards, wire transfers, ACH services, sweeps, and others. See O'Mahony et al., 1997, *Electronic Payment Systems*, Artech House, Inc., Norwood, Mass.

More specifically, the present invention provides low-cost financing to employee beneficiaries by simplified and routine access to a portion of the assets accumulated within their established benefit plans, especially pension benefit plans. This access is on an as-needed basis, by means of a variety of possible access vehicles (check, credit card, debit card, wire transfer, ACH services, sweeps, etc.), and without cumbersome paperwork, all while maintaining the assets both borrowed and available within the tax protection of the benefit plan. Importantly, the systems of the present invention interface efficiently to and work both with established employee-benefit-plan systems and administrations and also with established payment systems.

Methods of the present invention open, manage, and terminate a plurality of loan funds, at least one for each benefit plan participant that takes advantage of this invention. Importantly, these loan funds are managed independently of the plan by the invention. Also, since they are legally considered as employee investments, interest paid by plan participants on their outstanding loans (also called herein "redemptions") is actually accrued (less fees) to their own benefit-plan accounts, thus replacing high interest borrowing via bank cards for the participant.

The present invention further provides loan-management data-processing systems that interface and communicate with established benefit-plan-management systems and with established payment systems. The present invention's loan-management data-processing systems cooperate with these interfaced systems to open loan funds for a plan participant, provide for payment authorizations and redemptions from the loan funds, arrange funds transfers, provide repayment and status information to participants, and so forth. Thus, cumbersome paper procedures are minimized and participants can manage their loan funds according to their daily needs.

In the following, the benefit plan may be known as the "main" benefit plan to distinguish it clearly from the loan fund, especially in those alternative organization embodiments where the same financial organization may offer benefit plan services, loan fund services, or loan fund investment management services.

In a first embodiment the present invention includes computer system for providing loans to a participant having assets in a benefit plan comprising: a processor; and a memory operatively coupled to the processor, the memory including program data for causing the processor to perform the steps of: initializing loan-fund information stored in a computer database upon establishment of a loan fund for the participant, the information initialized with data representing the value of funds derived from the participant's benefit-plan assets and transferred from the benefit plan upon establishment of the loan fund, wherein the loan fund is managed by an investment manager and is recorded in the benefit-plan as an asset of the participant; and generating data representing requests to the investment manager to: (i) transfer funds from the loan fund to settle redemptions made by the participant, the participant making redemptions from the loan fund by use of at least one access vehicle; or (ii) accept funds into the loan fund from the participant in repayment of redemptions; and updating the stored loan-fund information with data representing fund transfers from and acceptances into the loan fund, whereby redemptions from and repayments to the participant's loan fund occur without access to the participant's benefit-plan assets.

In a first aspect of the first embodiment, the present invention further includes a communication interface for exchanging data between the computer system and a computer system of the investment manager, and the program further causes the processor to: update the loan-fund information upon receipt of data from the investment-manager computer system representing funds transfer from or acceptance into the loan fund; and update the loan-fund information upon receipt of data from the investment-manager computer system representing an accrual of interest into the loan fund; and further includes a communication interface for exchanging data between the computer system and a computer system of the benefit plan, and the program further causes the processor to: initialize the loan-fund information upon receipt of data from the benefit-plan computer system representing establishment of the loan-fund; and exchange status data with the benefit-plan computer system, wherein the computer system exchanges at least a representation of a current loan-fund balance, and wherein the benefit-plan computer system exchanges at least representation of limitations on the participant's redemptions.

In a second aspect of the first embodiment, the present invention further includes a communication interface for exchanging data between the computer system and a settlement computer system that process uses of the access vehicles. The program further causes the processor to generate (data representing) a request to transfer funds from the loan fund for settlement for the participant's uses of the access vehicles. The program further causes the processor to: receive data from the access-vehicle-settlement computer system representing a proposed redemption, which is approved only if the proposed redemption is less than or equal to the line of credit (LOC) value. In addition the program generates data to the access-vehicle-settlement computer system representing a refusal of the proposed redemption if the proposed redemption is greater than the LOC value. The LOC value will not exceed an available loan amount (ALA) value determined in accordance with statute, regulation, or policy in dependence on the participant's vested benefit-plan assets. Preferably, the determination preserves a tax-advantaged treatment of the participant's redemptions.

In a third aspect of the first embodiment, the program further causes the processor to: receive data from the access-vehicle-settlement computer system and update data representing the LOC value decreased by the total value of the redemptions. In addition, it also includes a communication interface between the computer system and a computer system of a funds-acceptance provider, and to accept (data representing) funds into the loan fund.

In a fourth aspect of the first embodiment, the program further causes the processor to generate data representing a loan-fund statement informing the participant of required repayment amounts and times. The required repayment amounts and times are determined in dependence on the total redemptions that have not yet been repaid and in accordance with statute, regulation, or policy to preserve tax-advantaged treatment of the participant's redemptions. Generated data is transmitted to the participant by means of the Internet network or a telephone network; and the program further causes the processor to generate data representing loan-fund status informing the participant of recent redemptions, or loan-fund balance, or required repayments; and the generated data is periodically transmitted as messages grouped into computer files.

In a second embodiment the present invention includes a computer-implemented method for providing loans to a participant having assets in a benefit plan comprising initializing loan-fund information stored in a computer database upon establishment of a loan fund for the participant. The information is initialized with data represents the value of funds derived from the participant's benefit-plan assets and transferred from the benefit plan upon establishment of the loan fund. The loan fund is managed by an investment manager and is recorded in the benefit-plan as an asset of the participant. Generated data represents requests to the investment manager to: (i) transfer funds from the loan fund to settle redemptions made by the participant; the participant may make redemptions from the loan fund by, inter alia, use of at least one access vehicle; or (ii) accept funds into the loan fund from the participant in repayment of redemptions. Updating of the stored loan-fund information with data representing fund transfers from and acceptances into the loan fund is accomplished in a manner whereby redemptions from and repayments to the participant's loan fund occur without concurrent interface with the participant's benefit-plan assets.

In a first aspect of the second embodiment, the loan-fund information comprises data representing at least a loan-fund balance; which is updated in response to receipt of data from the investment-manager computer system representing funds transfer from or acceptance into the loan fund. The steps further include: generating data for the benefit-plan computer system representing the current loan-fund balance and receiving data from the benefit-plan computer system representing the limitations on the participant's redemptions. Additionally, data may be generated representing a request for acceptance of funds into the loan fund, and the steps may further include receiving data representing requests to transfer funds from the loan fund to settle redemptions.

In a second aspect of the second embodiment, the present invention further includes the steps of: receiving redemption data from the access-vehicle-settlement system and updating the LOC value. Further steps include: receiving data from the access-vehicle-settlement system representing a proposed redemption; generating data to the access-vehicle-settlement system representing an authorization of the proposed redemption only if the proposed redemption is less than or equal to the then available line of credit (LOC) value; and generating data to the access-vehicle-settlement system representing a refusal of the proposed redemption only if the proposed redemption is greater than the then available LOC value. The LOC value is calculated so as not to exceed an available loan amount (ALA) value determined in accordance with statute, regulation, or policy in dependence on the participant's vested benefit-plan assets, wherein the determination preserves a tax-advantaged treatment of the participant's redemptions. The loan-fund information is further updated in response to receipt of data from the investment-manager computer system representing an accrual of interest paid or dividends earned into the loan fund.

In a third aspect of the second embodiment, the present invention further includes a step of generating data representing a loan-fund statement informing the participant of required repayment amounts and times. The required repayment amounts and times are determined in dependence on the total redemptions that have not yet been repaid and in accordance with statute, regulation, or policy to preserve tax-advantaged treatment of the participant's redemptions. Data generated is periodically transmitted as messages grouped into computer files to a plurality of participants, each having assets in the benefit plan.

In a third embodiment the present invention includes a program product comprising a computer readable medium having encoded program data for causing a computer to perform the methods of the present invention.

In a fourth embodiment the present invention includes a method for providing loans to a participant having assets in a benefit plan comprised of funds transferred to a loan fund from the benefit plan, wherein the loan fund is managed by an investment manager and is recorded in the benefit-plan as an asset of the participant. The investment manager will be directed to transfer funds from the loan fund to settle redemptions made by the participant by, inter alia, use of at least one access vehicle. The investment manager will also be directed to accept funds into the loan fund from the participant in repayment of redemptions, whereby redemptions from and repayments to the participant's loan fund occur without access to the participant's benefit-plan assets.

In a first aspect of the fourth embodiment, the benefit plan is directed to transfer funds to the loan fund; and the value of the funds transferred from the benefit plan is calculated to be less than the value of participant's vested assets therein. Participants may make a plurality of redemptions from the loan fund by using an access vehicle (including, but not limited to, check, credit card, debit card, wire transfer, ACH, sweep, etc.). Participant's redemption from the loan fund are authorized only if the total of the proposed redemption is equal to or less then the available line of credit (LOC), which is equal to or less then the available loan amount (ALA). The ALA is a function of the value of the participant's vested assets in their benefit plan.

In a second aspect of the fourth embodiment, the loan fund further comprises information representing a loan-fund balance, and the steps of: updating the loan-fund balance by: (i) increasing the balance upon receipt of funds transferred from the benefit plan or repaid by the participant, and (ii) decreasing the balance upon transferal of funds for settlement of redemptions. In addition, the benefit plan is periodically notified of the current loan-fund balance and the amounts due from the participant. Further the loan-fund information is further updated when the investment manager accrues interest into the loan fund. The steps of establishing, requesting funds transfer from, and requesting funds acceptance into the loan fund are performed in accordance with statute, regulation, or policy to preserve tax-advantaged treatment of the participant's redemptions. The statute, regulation, or policy includes one or more of the provisions of 26 U.S.C. §§ 1 and 401 et seq., and 29 U.S.C. § 1001 et seq. and any other similar programs and policies determined by the plan sponsor. Upon establishment, the loan fund is structured as a sub-custodian or a sub-trust of the benefit plan.

4. BRIEF DESCRIPTION OF THE FIGURES

Figure 2A:
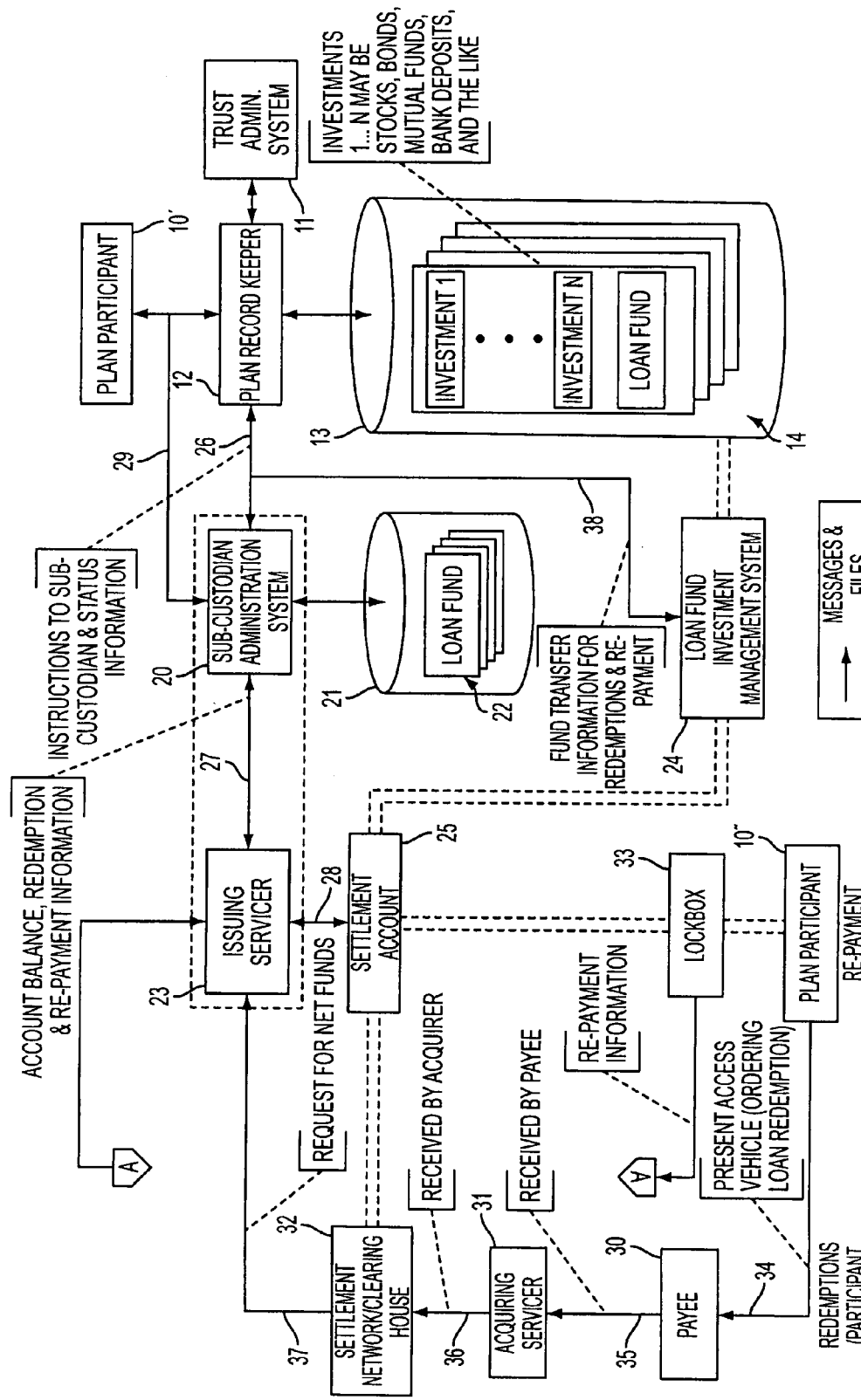
Figure 2B:
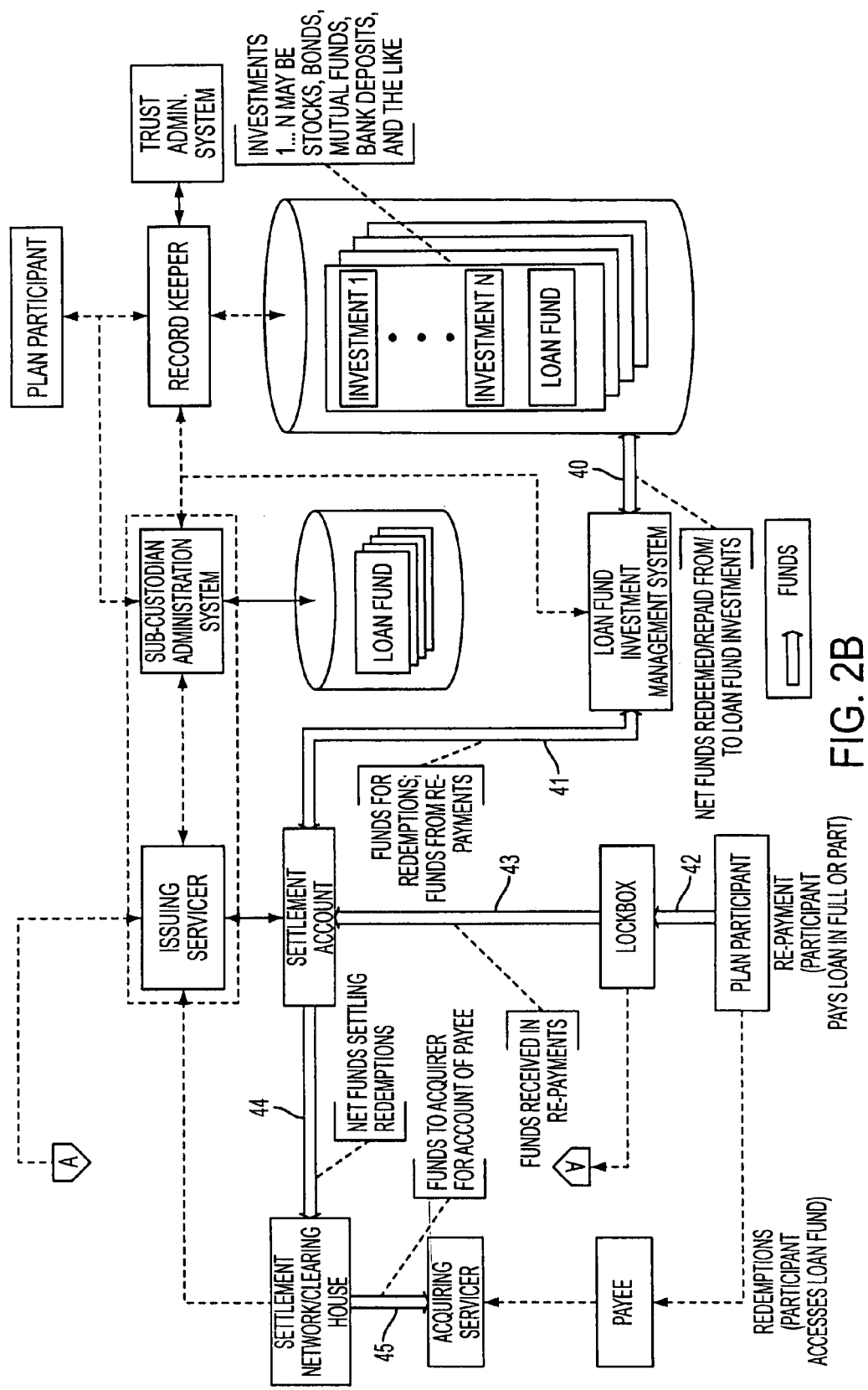
Figure 3A:
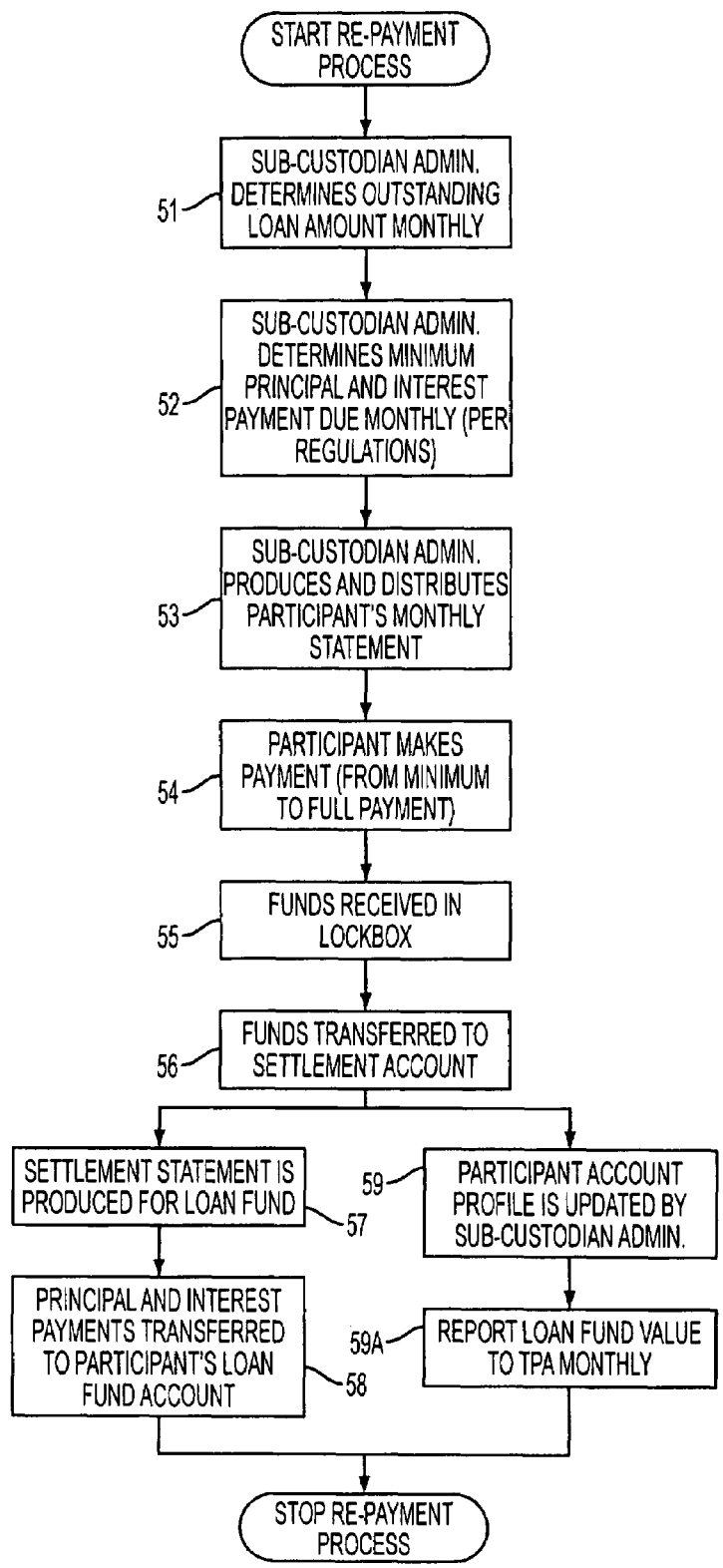
Figure 3B:
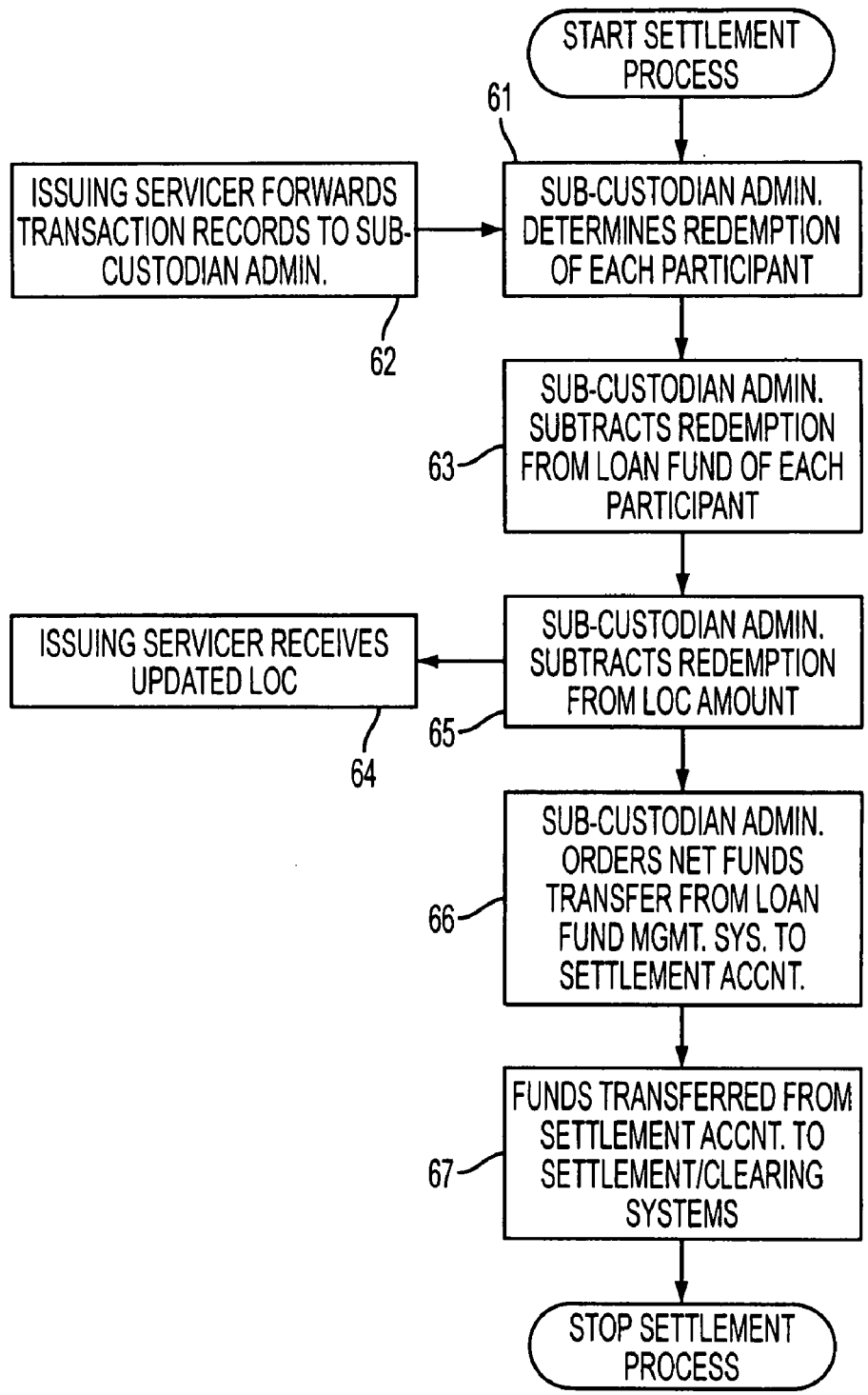
Figure 4A:
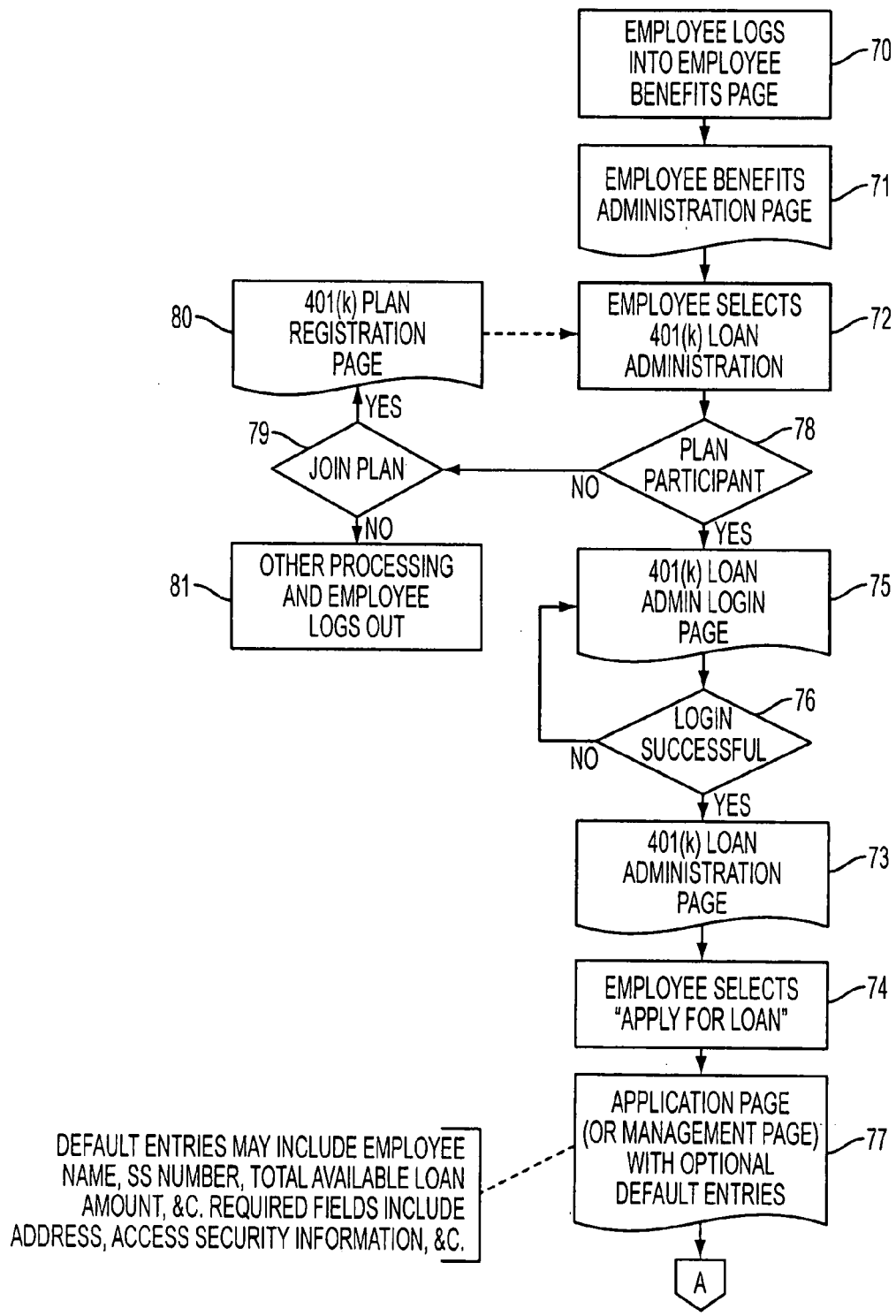
Figure 4B:
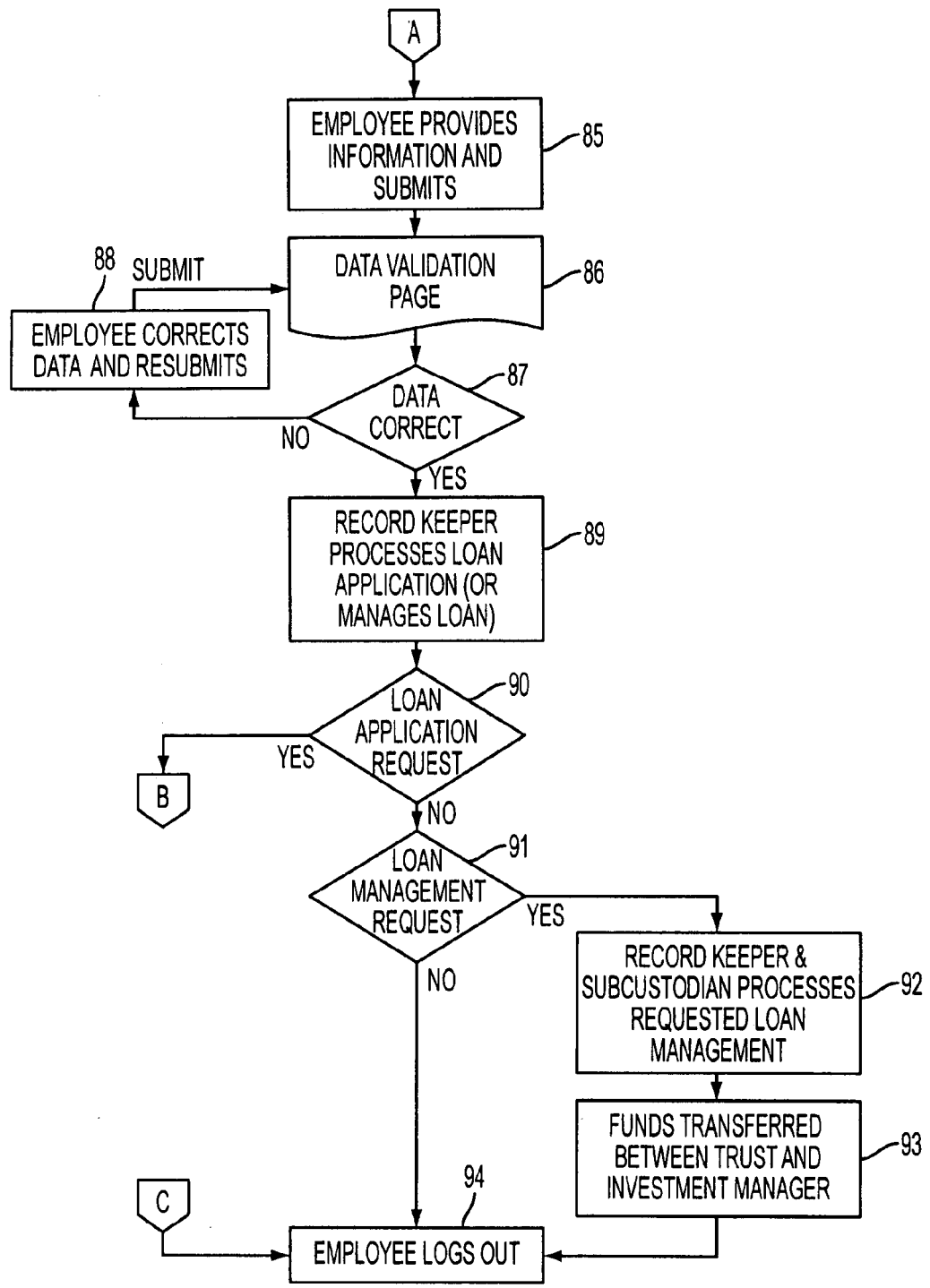
Figure 4C:
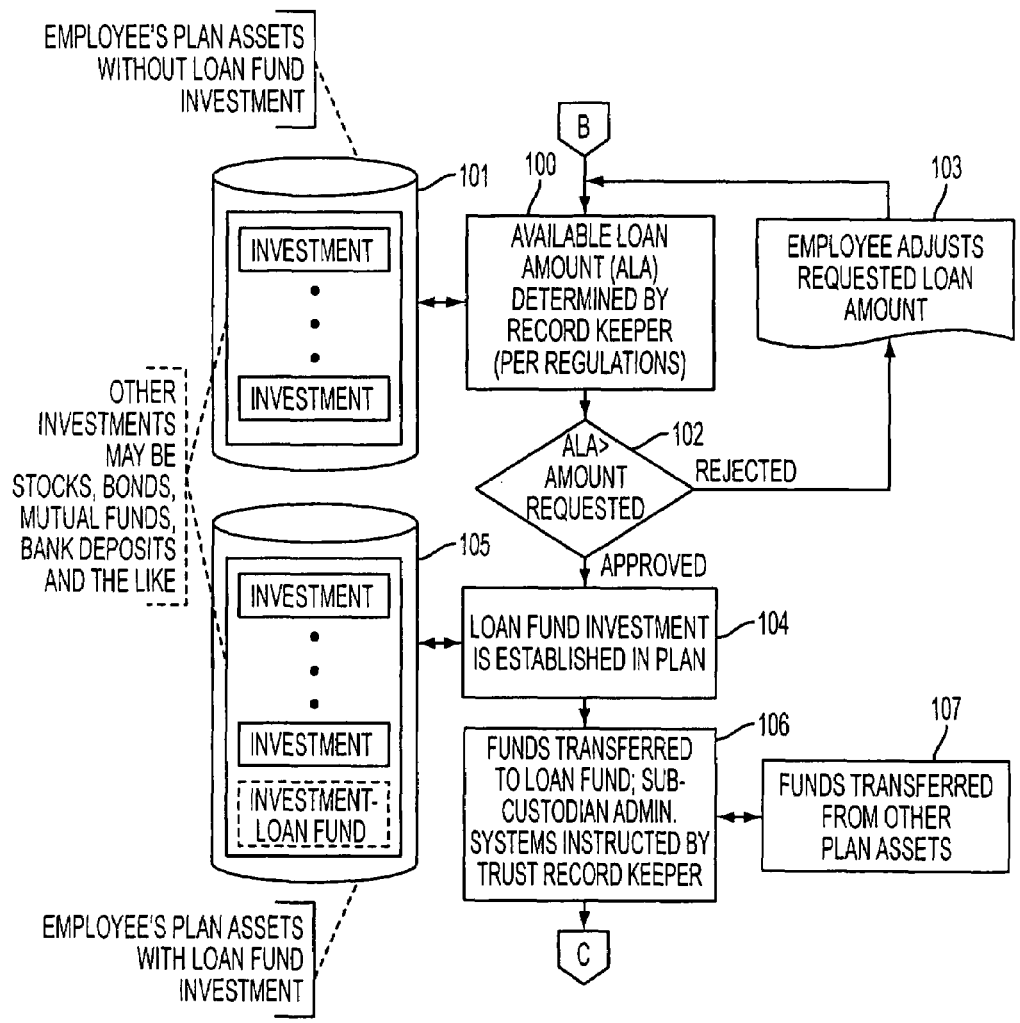
Figure 5:
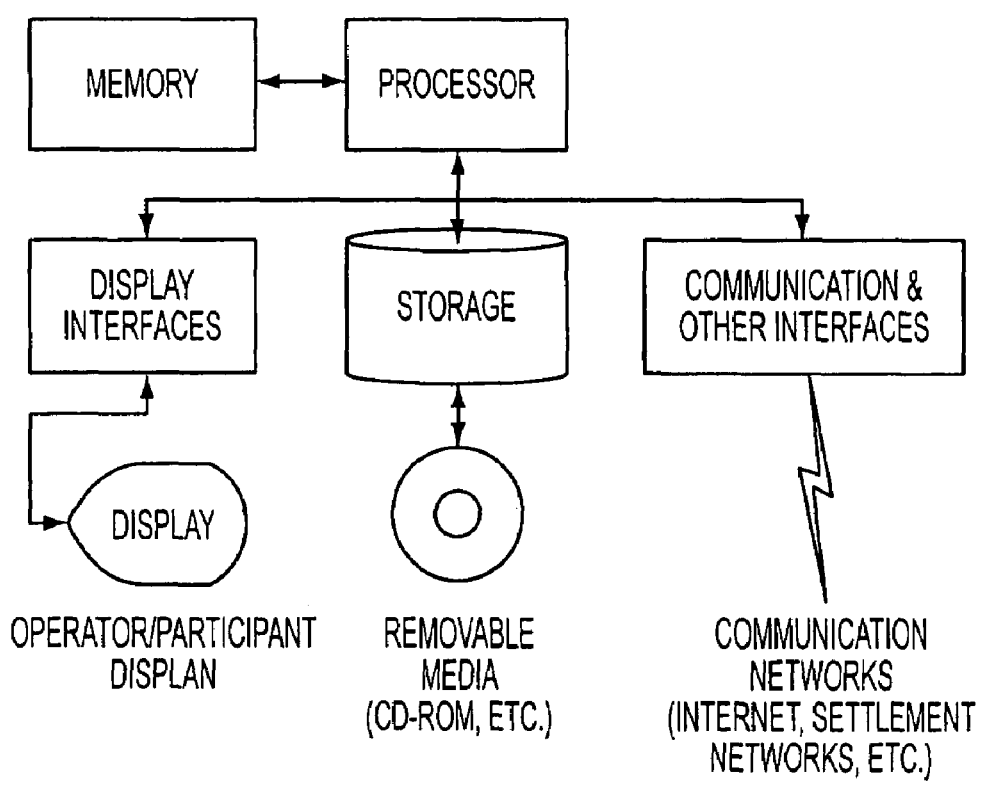

The present invention may be understood more fully by reference to the following detailed description of preferred embodiments, to illustrative examples of specific embodiments, and to the appended figures in which:

FIG. 1 illustrates a financial/legal structure used in a preferred embodiment of the present invention;

FIGS. 2A-B illustrate a system structure of a preferred embodiment of the present invention along with the information and monetary exchanges within the illustrated structure;

FIGS. 3A-B illustrate preferred repayment and redemption processes of the present invention;

FIGS. 4A-C illustrate preferred loan-authorization and setup methods of the present invention; and FIG. 5 illustrates a preferred computer system for performing software that implements methods of the present invention.

5. DETAILED DESCRIPTION OF THE INVENTION

In the following, the term "participant" (or "plan participant") refers to an employee-plan beneficiary (the plan perhaps providing retirement income), or generally to a benefit-plan beneficiary. A participant may be currently employed (i.e., an "employee"), between employment, or retired. The term "plan" refers to any employee-benefit plan meeting the expectations of the invention as described above, and includes pension plans, 401(k) plans, 403(b) plans, 457 plans, IRAs, Keough accounts, and so forth. The term "redemption" (or "loan redemption", "advance", "withdrawals", "purchase", "liquidation", etc.) refers to a participant's use of assets segregated in a loan fund established by the present invention as payment in a transaction. The term "repayment" (or "repayment by a participant") refers to a participant's loan repayment of any redemptions made through the process of the present invention.

Also, the term "interest" (when used in the context of interest on redemptions) refers to loan interest due from or paid by participants on their redemptions (that is, their loan principal). Participants thus repay both redemptions and any interest on the redemptions. The term "dividends" refers to earnings, if any, on balances in the participants' loan funds. Dividends are provided by the investment vehicles in which the loan finds are invested. The term "available loan amount" (ALA) refers to the maximum amount that may be used to finance redemptions determined in view of a participant's benefit-plan assets. Typically, the ALA varies with (e.g., as a fixed percentage of) the vested benefit-plan assets. The term "line of credit" (LOC) refers to the amount available to finance current redemptions. Typically, the LOC varies with (e.g., is equal to) the current, unredeemed funds in a participant's loan fund.

Further, the term "access vehicle" refers generally to financial and procedural mechanisms by which an individual may access for use funds available in or through a demand deposit account, or a line of credit, or other financial instruments. Access vehicles include "traditional access vehicles," which may be, but are not limited to, checks, or electronic checks, or credit cards, or smart cards, or debit cards, or wire transfers, or ACH services, or sweeps, or automatic teller machines (ATM), or so forth. Preferred access vehicles include automatic processing mechanisms (generally networked computer systems) that can be easily interfaced to the systems of the present invention to access participants' loan funds. (As one of skill in the art will appreciate, the present invention may interface to new access vehicles which are being developed or are yet to be developed.)

Described next are the general embodiments and accompanying advantageous functional features of the present invention. Described subsequently are the legal and financial structures to which the present invention is applicable, system structures of the present invention, and lastly the methods of the present invention.

5.1 GENERAL EMBODIMENTS AND FUNCTIONAL FEATURES

The present invention provides supplementary "loan funds" within employee-benefit plans, similar to plans authorized (in the U.S.) by 26 U.S.C. §§ 401(k), 403(b), or 457, or similar to individual retirement accounts (IRA), or Keough accounts. These statutory plans are designed to accumulate financial assets to support, for example, participants' pension or retirement needs. Preferably, applicable plans also provide separate accounts for each individual participant, each account holding accumulated assets that are invested according to at least partial participant control in various investment vehicles and including options permitting participants to borrow assets from their plan accounts.

The "loan fund" of the present invention makes conveniently available to participants redemptions funded by a portion of the participants' accumulated benefit-plan assets. Within individual participant accounts in an applicable benefit plans, according to the present invention, "loan-fund investments" (see, e.g., 5 in FIG. 1 and its subsequent discussion) are established and invested in appropriate "loan-fund" investment vehicles. The loan-fund investment vehicles are managed by one or more investment managers, preferably already established and experienced investment managers, so that, primarily, the vehicles maintain high liquidity with substantially constant face value, and secondarily, so that the vehicle earns reasonable dividends consistent with the primary goals of the benefit plan. In the U.S., "money-market" funds may serve as appropriate loan-fund investment vehicles, although other investment vehicles with reasonable liquidity may also serve as such vehicles. Other possible investment vehicles include bank demand deposits, or certificates of deposit, or certain stocks, or bonds, or mutual funds, or so forth.

The present invention then provides administrative systems which are responsible for managing and directing the transfers of funds in and out of the participants' loan funds and for establishment and maintenance of loan funds. The value of a participant's loan-fund investment recorded in the benefit plan changes as the balance in that participant's loan fund changes. The benefit-plan loan-fund-investment value further increases as interest and dividends are accrued to the benefit plan. In order that a participant can access assets from their individual loan fund, this invention's administrative systems interface, on one hand, to established payment systems (e.g., the Visa® or MASTERCARD® networks).

On the other hand, these administrative systems interface with established benefit/pension plan management systems, which are often divided functionally and perhaps physically, into a record-keeper function (or system) and a plan-management function (or system; in the U.S., typically a trust company monitors plan assets). Specifically, the provided administrative systems are designed to interface with record-keeper functions in order to frequently (for example, daily or weekly or monthly) update the benefit plan with the current value of the participants' loan-fund investments. This interface is preferably substantially similar to the record-keepers' interface with other investment systems managing other investments present in participant accounts. The actual loan-fund administrative management function (or systems) of this invention need only interact with the existing benefit-plan administrative systems (i.e., record-keeper systems) when a participant decides to make, change, or terminate investments in the loan funds, an interaction consistent with the interactions the plan management function has with other investment-management systems.

In operation, the administrative systems of the present invention draw cash assets from a participant's loan fund to cover redemptions, and add cash assets to a loan fund when the participant repays outstanding loans (or redemptions). Therefore, cash assets remain in a participant's loan fund, accounted for in the benefit plan as an investment of the participant, until the very moment they are needed and are repaid to the loan fund and recorded in the benefit plan as received from the participant. The unused amounts remaining in the loan fund continue to provide dividend income to the participant's plan account, while the participant pays interest only on the cash redemptions actually withdrawn from the loan fund.

Moreover, it is preferable that the administrative systems manage participants' loan funds so that amounts in the loan funds whether redeemed to the participant or still available for loan (that is "on call"), as well as interest paid on redemptions and dividend income earned on the on-call amount, continue to have the tax advantages of the benefit plan. Thus loan-fund assets are maintained within the benefit plan under favorable tax advantages by the individual participant until actually borrowed (redeemed), and upon borrowing, are replaced by loan receivables due from the participant. Thus, interest paid and redemption repayments receive similar tax advantages. The administrative systems of the current invention also enable participants' outstanding loans to be 'portable', thus eliminating the need for participants to pay off outstanding loans upon employment termination.

Briefly, a participant's maximum available loan amount is typically limited by statute, regulation, and perhaps also by plan policy to a certain percentage of the vested value in the participant's benefit-plan account. The loan fund is preferably structured as a sub-custodian (or a sub-trust) (operating similarly to a self directed brokerage account) of the benefit-plan, which is often legally structured as a trust. The systems and methods of the present invention then manage processes for settlement of participant redemptions and acceptance of participant repayments so that the tax advantages of the benefit plan flow to the loan fund as an investment within the plan.

Accordingly, the loan funds provided by the present invention are a substantial improvement over current benefit-plan loan processes, and also are significantly more economical then traditional unsecured personal borrowing, such as bank credit card loans. Because the present invention provides loan access related to the value of the established loan fund, borrowing costs are dramatically reduced below typical bank cards. In fact, the interest paid by the participant on loans made possible by this invention (and dividends earned by the loan fund) is credited to the participant's own benefit-plan account. Neglecting expenses, loan interest paid becomes retirement savings. Further, because the present invention increases the accessibility and liquidity of participant assets saved in benefit plans, increased participation in and contribution to benefit plans are likely.

In other words, the present invention enables the participant to maintain the funds within the plan until moment needed. The interest charged the participant for the financing redemptions benefits the participant, therefore creating an alternative form of daily transactional financing that reduces the overall cost of funding needs of the participant and enables substantial cost savings over traditional credit card financing, especially, but not exclusively, for low to middle income plan participants that do not have access to alternative low cost forms of credit (i.e. home equity financing).

In addition to these financial advantages, the structure of the administrative systems of the present invention provides additional and significant process and procedural advantages. As described, the administrative systems separate routine (often, daily) use of a participant's cash resources (or cash-equivalent or other liquid assets) in their loan fund from those exchanges and transfers supporting a participant's longer term decisions (typically, monthly or even yearly) on asset allocation, including the size of loan fund to make available for redemptions from the participant's benefit-plan account.

Advantageously, the invention interfaces high frequency (for example, daily or even hourly) exchanges and transfers only to established payment systems, which are designed to handle high-volume, standardized transactions. It limits exchanges and transfers with benefit-plan systems to those of lower frequency (for example, monthly or yearly), which result from participant investment decisions. Established benefit-plan systems (specifically, record-keeping systems) are already designed to handle these lower-frequency investment-decision driven transactions.

This structure allows the invention to provide the loan funds in the context of established and functioning financial systems while requiring, at most, minimal modifications to these existing systems. From the point of view of these existing system, little impediment to implementation of the loan funds of the present invention is apparent. Additionally, benefit-plan processing costs for managing this invention's loan fund are reduced in comparison to existing loan plans, because implementation of this invention does not substantially burden the processing already performed by current benefit-plan systems, the type of processing for which they have been designed. These cost savings may be passed on to a plan sponsor (such as an employer) and could be an incentive for the adoption of the present invention, ultimately increasing participation in benefit plans.

Further, the administrative systems preferably provide for participants' enhanced access, for example, by means of the phone or Internet and standard web browsers, for rapidly creating loan plans, for funding of and repayments to their loan plans, and for reporting on their balances and transaction, availability and status information, electronic checking and payment, and the like. This allows participants the privileges and benefits of traditional access vehicles along with real-time tracking and accessing of information via phone or Internet.

In more detail, the administrative systems of the present invention include one or more data-processing systems mutually interconnected. This system processes programs that establish and maintain loan funds so that regulatory funding, redemptions, repayments, and interest-rate criteria (on outstanding redemptions) are met to support tax-qualified loan based transactions. These data-processing systems monitor a plurality of loan-fund accounts, each associated with a single participant's plan, preferably for multiple employers, and perhaps, even for multiple jurisdictions. The system monitors and determines funding criteria for each participant based on the available line of credit (LOC) value derived from the loan-fund asset composition. The funding criteria are applied to the access vehicles and are used to support redemptions made to the respective plan participants. These loans (redemptions) are thereafter charged an interest rate based on market factors. The system handles the redemption process and the repayment process within the loan-fund system per established regulatory requirements, and importantly, without burdening established benefit-plan systems with a new type of frequent transaction.

Specifically, the legal relationship of the loan funds to the benefit plan is preferably that of a sub-custodian to the benefit-plan trust. In other embodiments, this relationship may be that of a sub-trustee, may be contractual, and so forth.

5.2 DETAILED EMBODIMENTS

Described here are legal structures of the invention; described subsequently are system and methods of the invention.

5.2.1 LEGAL STRUCTURES OF THE INVENTION

FIG. 1 illustrates a preferred organizational and legal structure for the invention. The ultimate beneficiaries of the invention, and of the associated benefit plan, are a plurality of (at least one) participants 1. Benefit plan 2 has a legally-recognized responsibility to the participants to properly manage their assets and benefits, and includes a plurality of (at least one) accounts 3, for each participant beneficiary 1. Each account 3 includes at least one investment, and in the majority of instances, a plurality of investments, typically 2-5, of which the composition and asset allocation is at least partially directed by its associated participant beneficiary.

In U.S. embodiments, the benefit plan is usually structured as a legal trust, which stands in a fiduciary relationship to the participants and is regulated by ERISA. In order that the plan qualifies for tax deferral (tax qualified), employee participation in the plan and plan funding are regulated by the IRC.

The present invention adds to this benefit-plan structure a loan fund 4, which has responsibility for a plurality of (at least one) loan funds 5, one loan fund for each participant who has chosen to participate in this invention. The elements added by this invention are indicated in FIG. 1 by dashed outlines. The loan fund has a legal relationship to benefit plan 2 which maintains the correct administration of the loan funds according to statutory and regulatory requirements and according to plan policies and procedures (e.g., plan loan policies, privacy policies, and the like). Generally, a participant taking advantage of this invention directs the benefit plan to transfer a part of their assets into the loan fund, so that from the point of view of the benefit plan, a participant's loan fund appears as an investment by the participant. Preferably, dividend income generated by the loan fund is accrued as investment income to the participant's benefit-plan account.

5.2.2 BENEFIT-PLAN AND PAYMENT-SYSTEM STRUCTURES

FIGS. 2A-B illustrate a preferred system structure of the invention. With reference first to FIG. 2A, to the right in this figure are the elements and systems usually found in established benefit plans, namely elements 10'-14. To the left in this figure are the elements and systems usually found in established payment systems, namely elements 10" and 30-33. The participant appears twice in these figures, at 10' as a beneficiary of the benefit plan and loan fund and at 10" as a user of a loan fund provided by the invention. The present invention adds primarily elements 20-22 which collectively act to manage the loan fund. In U.S. embodiment, the loan fund is preferable structured as a sub-custodian plan (similar to a self directed brokerage account) of the benefit-plan trust. (In other embodiments, this invention may incorporate some or all of the benefit plan and the payment system functions. In particular, if the present invention is practiced by a bank, issuing servicer function 23 may be conveniently practiced along with the invention's methods; if the invention is practiced by an investment manager, management functions 24 would naturally by practiced along with this invention's methods.)

In FIG. 2A, solid arrows represent message communication. Alternatively, a batch of messages may be accumulated in a file and periodically (hourly, daily, or so forth) communicated as a file transfer. Further in FIG. 2A, all systems and message/file transfers have individual reference numerals. In turn, FIG. 2B illustrates funds transfers by hollow arrows (dashed, hollow arrows in FIG. 2A), all having individual reference numerals. Because identical systems and message/file transfers (dashed, solid arrows in FIG. 2B) appear in FIGS. 2A and 2B, for convenience and clarity, only funds transfer have reference numerals in FIG. 2B.

Turning first to the right-hand systems usually found in established benefit plans, trust administration systems 11 and plan record keeper 12 perform overall management of the benefit plan, ensuring that the terms of the employers trust agreements (i.e., plan policies) are carried out in a manner consistent with statutory and regulatory requirements. Trust systems 11 communicate, on one hand, with employer systems (not illustrated) receiving employee salary and contribution information, and on the other hand, with plan record keeper 12. Record keeping is a largely administrative activity conceptually separate from trust management and often physically delegated to separate systems or even to separate organizations. Administrative record-keeper systems 12, inter alia: maintain plan database 13 including, at least, information characterizing each plan participant's account including its investments; receive instruction from and provide status information to trust administrator systems 11; receive requests from and provide account information to participants 10'; receive employee contributions from employers (not shown); exchange funds with the managers of the participant investments (not shown); exchange funds with the investment manager component of this invention; and so forth.

For example, in the U.S., benefit plans are often services provided to employers by mutual fund organizations, such as Fidelity, Vanguard, and so forth. In this case, although systems 11 and 12 and database 13 may all be within the mutual fund organization (or an administrative subsidiary of the mutual fund organization), they are typically implemented by separate software systems optionally running on separate hardware server systems. Additionally in this case, because investments available to participants may be largely limited to the funds provided by the mutual fund organization, the investment manager systems may also be within the same organizational structure.

The left hand systems are those usually found in established payment systems that process access vehicles. Most access vehicles that the invention interfaces to are "issued" by an issuing servicer, in the U.S. usually a bank, which processes and funds its issued access vehicles. When a payer uses an issued access vehicle in a transaction, the settlement system for that vehicle ultimately returns a payment request to the issuing servicer (or bank) for payment and presentation to payer. It is also common for the issuing service to authorize use of its issued access vehicles at transaction time, for example, checking for sufficient payer funds (or that a line of credit will not be exceeded). Because the issuing servicer is thus the sub-custodian's portal to loan redemptions, the sub-custodian administration systems 20 must smoothly interface and closely cooperate with issuing servicer systems 23, as indicated by the dashed box enclosing these systems in FIGS. 2A-B. Indeed, in some embodiments of the invention, both systems may be part of related organizations. Further, in other embodiments, the sub-custodian administration system 20 may interface to more than one issuing servicer so that loan-fund participants may have the convenience of alternative access vehicles.

In more detail, on the loan redemption side, loan-fund participant 10" presents 34 one of the access vehicles provided by the loan fund to payee 30 in satisfaction of a transaction. Payee 30 then periodically (for example, daily) forwards a batch of access vehicles received in transactions to acquiring servicer 31, usually a bank, which acquires these vehicles from the payee and credits the payee's account with their value (minus a fee). Servicer 31 then periodically (for example, also daily) forwards a batch of access vehicles received from its payees on to the appropriate settlement network (e.g., the MASTERCARD or the VISA networks) or clearing house system (e.g., the U.S. Federal Reserve Bank check clearing system) for payment. The settlement/clearing systems net the access vehicles and forward to issuing servicer 23, also usually a bank, a request for net payment (or other net transfer) along with records indicating which participant 10" paid what amount to which payee 30. Accordingly, issuing servicer 23 then orders 28 (or requests, both usually by electronic communications) funds transfer from its settlement account 25 to settlement/clearing system 32.

On the loan repayment side, the sub-custodian administration system, after determining each plan participant's outstanding loan, calculates the next required minimum principal and interest payment (and an optional full principal and interest payment), which it forwards 29 to participant 10' (equivalently, 10"), optionally along with records of the participant's redemption transactions (for example, as a paper or electronic statement). This calculation is performed at a selected frequency (weekly or monthly if a loan balance is outstanding) and according to selected rules so that all applicable statutory and regulatory (especially tax) mandates are met along with any more restrictive benefit-plan policies. In response to payment requirements, participant 10" forwards repayment instructions, typically, to a separate payment-handling organization, "lockbox" 33. A lockbox has delegated to it the responsibility for receiving, forwarding, and appropriately applying payments, both for this invention as well as for other financial systems in the usual case (i.e. it acts as a provider funds-acceptance services). Alternatively, the present invention could itself supply the lockbox (or funds-acceptance) function. Administrator system 20 is informed (preferably by electronic communications) of a participant's payments, and updates the loan-fund records for the participant.

Turning to FIG. 2B to review the funds flow during redemptions and repayments, first, settlement of loan redemptions for plan participants' results in net flow 44 of funds to settlement/clearing systems 32, which then in turn forward the funds to the correct acquiring servicers 45 for the account of the various payees. Loan repayments begin with participant 10" forwarding 42 funds to the designated lockbox 33, which then in turn forwards 43 them on to settlement account 25 of the invention. The settlement account receives 41 settlement funds transferred from a participant's loan fund; repayment funds are forwarded 41 for acceptance into and ultimate deposit 40 to the participants' loan-fund investment. (In this embodiment, the settlement account acts as a funds transfer buffer between the loan fund and the entities receiving or providing funds; in alternative embodiments, the settlement account may not be needed, all funds flowing directly from the loan fund.)

One of skill will understand from this description and the appended figures how to adapt this invention to other payment systems.

5.2.3 SUB-CUSTODIAN SYSTEM STRUCTURES

FIGS. 2A-B also illustrate the specific elements of the invention, elements 20, 21, and 22, those elements closely associated with these specific elements, elements 23, 24, and 25 (which may optionally be practiced along with the methods of this invention), along with the associated electronic message/file exchanges and funds flows.

The sub-custodian administration system 20 plays a central role in the invention, preferably implementing the methods described subsequently. It receives instructions 26 from benefit-plan record keeper 12 for establishing loan-fund investments (maintained and managed by loan-fund investment management systems 24) and lines of credit (LOC) values for a new plan participant; provides 26 status information to record keeper 12 including a participant's current account balances, outstanding loan redemptions, and available LOC; and receives further instructions 26 for modifying or terminating a participant's loan-fund investments. Loan-fund establishment includes, inter alia, initializing loan-fund information 22 in database 21, and accepting into the loan fund initial funds transferred from the benefit plan. The instructions (equivalently, requests and responses) are preferably electronically transmitted between the various systems.

System 20 also provides orders to loan-fund investment management system 24 to cause and monitor asset transfers from a participant's account consequent to loan redemptions from 41 a participant's loan-fund account, and also loan repayments accepted into 41 a participant's loan-fund account, and also to cause and monitor funds transfers 40 with the benefit plan. Transfers with the benefit plan occur consequent, inter alia, to initial funding of the loan fund, as well as consequent to subsequent funding changes occurring when participants designate more (but always less than the ALA value) or less of their benefit-plan assets for investment in their loan funds 5 (FIG. 1). Final transfer to the benefit plan occurs when the loan fund is terminated.

Periodic transfers to benefit-plan accounts may also occur consequent to the accrual of accumulated interest and dividends into the participants' benefit-plan accounts. Interest may be paid by participants on their outstanding redemptions (at, e.g., a market rate in order to maintain the redemptions' tax advantages), and is received by the loan-fund investment management system 24 (directly or indirectly) from lockbox 33. Dividends may be earned on (unredeemed) balances remaining in the loan funds, and is received by the loan-fund investment management system from the investment vehicles in which the loan fund is invested.

These interest and dividend funds are preferably accumulated to the account of the participants at the loan-fund investment management system, and are periodically transferred ("swept") into the benefit plan system 14, where participant benefit-plan assets are accordingly updated. If the transferred interest and dividends update that participant's vested benefit-plan assets, the participant's ALA may be automatically updated. (However, the participant's LOC will not be updated unless the participant requests that some of all of these funds be invested in that participant's loan fund.)

Less preferably, interest and dividend funds may be deposited directly into the participant loan fund by the loan-fund investment management system, and the ALA and LOC values may then both be automatically updated, assuming that such updates qualify under plan rules and governmental guidelines.

Additionally, system 20 interfaces closely with issuing servicer 23 (or the equivalent financial institution) and indirectly (or directly) controls funds transfers through settlement account 25 (by electronic requests and responses). Information received 27 from servicer 23 includes transaction records of participants' loan redemptions, currently available LOC values, periodic requests for funds for settlement of redemption transactions, and the like. Information sent 27 to servicer 23 includes current maximum allowed LOC values, which in most cases the servicer uses to authorize payments at transaction time (e.g., by comparing a requested redemption with the available LOC value. (The redemption is authorized if less than the LOC value and the LOC value reduced by the redemption; the redemption is refused or not permitted if greater than the LOC). Generally, the information exchanged is adapted to the needs of proper sub-custodian administration.

To perform these functions, the sub-custodian administrator system of the current invention maintains database 21 describing the loan fund and its participants. For each loan-fund participant, database 21 maintains records 22 of loan-fund redemptions due to access vehicle transactions, loan-fund repayments, current balances in loan-fund-investment-management system 24, current amounts of these balances assigned to loan-fund redemptions (i.e., the participant's current line of credit (LOC) values, available loan amounts (ALA) values), administrative information, historical audit information, accrued interest, dividends earned, and so forth.

The present invention includes the possibility that a participant may chose to invest in the loan-fund investment vehicles as well as use this investment vehicle to provide for loan redemptions. In such an embodiment, the administrator system may also maintain the amount in the load fund investment to be retained for investment purposes along with the amount to be made available for loan redemptions (the sum of these two amounts typically being the participant's total loan-fund invention balance).

Further, this database preferably also includes administrative information describing the loan funds supported along with system information for operating and interfacing to the various computer system illustrated in FIGS. 2A-B. In certain embodiments, because the methods and systems of this invention may serve employers in various jurisdictions and benefit plans with various loan policies, administrative information includes information for performing loan determinations, calculations, payments, reporting, and so forth, for each plan, employer, and jurisdiction as needed. This information may be, for example, represented as rules indexed by jurisdiction and benefit plan and stored in the database. Whenever necessary, the methods retrieve the appropriate rule in order to make a required determination in accord with statute, regulation, and plan policy. In further embodiments where the invention interfaces to several separate payment systems, administrative information also advantageously includes payment interface rules preferably represented in similar fashions.

The messages exchanged illustrated in FIGS. 2A-B are described in Tables 1 and 2 for an illustrative embodiment. Table 1 describes primarily the purpose of the message, while Table 2 describes the message flow and contents. In alternative embodiments, the information may be exchanged as individual message or batched into files of many messages.

TABLE 1

| File/message | Purpose |
|---|---|
| Account file | Directions from the trustee/record keeper responsible for the plan to the sub-custodian responsible for the loan-fund investment and for its use as an access vehicle |
| Maintenance report | Current status of the loan-fund investment from the sub-custodian |
| Trust transfer completed file | Confirmation of fund transfer between the plan trust administrator and the loan-fund manager |
| Daily dividend report | Updates the sub-custodian (and its record keeper) with the dividend income earned by the loan-fund account |
| Account status file | Instruction to access-vehicle servicer on maximum credit allowed |
| General ledger (G/L) settlement report | Instructions regarding settlement of redemptions and repayments by the participant from their loan-fund account |

TABLE 2

| File/message | Exchanged between (ref. no. in FIG. 2A) | Contents |
|---|---|---|
| Account file | Plan record keeper → Sub-custodian admin. system (26) | Batch no.; ACNT; ID; Amount of credit line; SC |
| Maintenance report | Sub-custodian admin. system → plan record keeper (26) | ACNT; SSN; Amounts of - credit line, money market balance, loan balance, total dividends earned, total interest paid; total fees paid to plan (whether paid as interest to plan or fees); Date amounts as-of; SC |
| Trust transfer completed file | Investment manager sys. → sub-custodian admin. system (38) | Batch no.; ACCNT; Amount transferred; Date received |
| Daily dividend report | (same) | ACNT; Amount of loan-fund balance; Amount of dividend; Date amounts as-of |
| Account status file | Sub-custodian admin. system → issuing servicer (27) | ACNT; ID; Amount of credit line; SC |
| General ledger (G/L) settlement report | Loan admin. system → Sub-custodian admin | G/L accounting fields; settlement transfer instructions; Amount to transfer |

In these tables, the "File/message" column provides a conventional name for the information exchanged or for the file. Generally, the information is exchanged periodically (for example, daily) in the form of files of a batch messages accumulated during the day. The "Exchanged between" column provides the names of the entities exchanging the named information along with the reference numeral in FIG. 2A of the exchange. The "Purpose" column generally describes why the information is being exchanged.

Finally, the "Contents" column provides a summary of the message contents or the contents of each file record. The following abbreviations are used in the Contents column: ID for participant identifying information (ID) such as name, address, phone no., social security number (SSN), birth data, security key (ex., mother's maiden name); ACNT for participant account identifying information; SC for action/status codes describing the account action the information parameterizes, for example new account, credit line increase or decrease, close account—employment termination, close account—death, close account—default, close account—plan termination; and batch number for identifying the actual file or message exchanged.

Implementation of the Invention's Systems

Sub-custodian administrator system 20 is preferably implemented with one or more standard server-type computer systems. FIG. 5 illustrates an exemplary server-type system. Suitable systems include Intel-based servers such as are widely available from, e.g., IBM, Dell, Hewlett-Packard, Compaq, and so forth. Suitable operating software includes a Microsoft windows family system, such as Windows NT or XP server, or a UNIX family system, such as Linux from Redhat. Database 21 is preferably stored on attached disk storage and managed by Oracle database software, by IBM DB2 database software, and the like. The server systems and linked to general communication networks, such as the Internet, and to dedicated special-purpose financial networks, such as clearing networks, by communication interfaces.

The use of the term "computer system" (or of "system" where computer system is understood) is meant to includes systems of one or more cooperating computers, each computer including one or more cooperating processors and memories.

Functions and methods performed by the sub-custodian administrator systems 20 may be programmed in a convenient language, for example Java, C++, C, or by means of an application generator. Programs are compiled to executable code (or interpreted), loaded into memory, and executed by the processor. Executable programs may be stored on and loaded into memory from computer-readable, removable media. These media include optical media, magnetic media; download from a server across a computer network, and the like as known in the art.

In an exemplary programming paradigm, known as an event-based paradigm, the programs may be structured as modules that process each incoming message or file, updating databases, and generating consequent request messages or files. Other modules may be periodically invoked to monitor and respond to changes in, e.g., participant status, funds levels, or so forth 5.2.4 METHODS OF THE INVENTIONS Described herein with respect to FIGS. 3A-B are the participant repayment and redemption processes of the present invention; and with respect to FIGS. 4A-C, the processes for loan-fund application, set-up, and modification.

FIG. 3A illustrates an embodiment of the participant loan repayment process of the present invention. Periodically, preferably monthly or more frequently, for each loan-fund participant, the sub-custodian administrator system (also referred to in this subsection as the "administrator system" or the "administrator") determines 51 the monthly outstanding loan amount, for example, by adding the sum of the participant's repayments minus participant's redemptions and interest due on and fees charged to the previous outstanding loan amount. The redemption and repayment information has been received from, for example, the issuing servicer and the lockbox system. Repayment information is forwarded (28 in FIG. 2A) to the issuing services from the lockbox system. Next, the administrator system determines 52 minimum principal and interest payments due from the participant according to the regulations applicable in the jurisdiction of the benefit plan (for example, in the U.S. from 26 U.S.C. § 72), and formats and distributes 53 the participant's monthly bill preferably listing transactions, amounts due, and loan-fund balances, and the like. Distribution may be by mail, or by on-line electronic means, or so forth.

Next, the participant pays 54 at least the minimum amounts due or optionally up to the entire loan balance. Repayments are received 55 by the lockbox system and forwarded 56 to the system settlement account with a payment report forwarded 57 to the issuing servicer (and then on to the administrator).

Lastly, the administrator system orders the transfer of funds 58 from the settlement account and acceptance into the loan-fund investment manager system (24 in FIG. 2A) for the accounts of the participants. Concurrently, the administrator may update 59 in its database (21 in FIG. 2A) participant records with current loan-fund balance data, outstanding redemptions, and corresponding current LOC value. The LOC value is also forwarded to the issuing servicer so that it may properly authorize transactions for the participants.

Next, FIG. 3B illustrates an embodiment of the access vehicle redemption process of the present invention. Periodically, preferably daily (or at another frequency determined by the characteristics of particular access vehicles and their processing systems), the redemption process starts with the administrator system determining 61 total redemptions for each participant. The redemptions are, for example, determined from the sum of all the participant's transaction amounts for that period forwarded 62 from the issuing servicer. (Alternatively, the issuing servicer may receive and send net redemption information from the settlement network, supplemented by any "own" redemptions (a transaction in which the issuing servicer also acquires the transaction)) It is the issuing servicer that interfaces directly with the particular payment systems, and authorizes transactions and receives completed transaction information. The administrator then updates the current loan-fund balance 63 and the current LOC value 64 by, e.g., subtracting redemptions from their previous values. Optionally (not illustrated), the administrator system may also add to these values repayments of both principle and interest received during the period.

Next, the issuing servicer receives 64 the new LOC value so that it may properly authorize transactions during the next period. The administrator also orders the loan-fund investment manager system to transfer net funds 66 from the loan fund to the settlement account from the accounts of the participants. Finally, the settlement account forwards funds 67 to the settlement/clearing systems for the various access vehicles; these systems then internally distribute funds to satisfy payees.

From FIGS. 3A-B it can be appreciated that the sub-custodian administrator system has no necessary interactions with the benefit-plan systems during cash redemptions or repayments by the participant; these activities occur between the administrator system, the established payment systems, and the investment manager for the participant loan-fund accounts. At most, the sub-custodian administrator may update the benefit-plan record-keeper system with information, for each participant, concerning loan-fund balances and their asset composition, interest paid, dividends earned, fees charged, and so forth. This update, and other reporting, is according to the sub-custodian's fiduciary responsibilities to the plan. The benefit-plan systems need not necessarily be concerned about individual participant transactions, either for information purposes or for processing purposes unless they choose to do so.

Next embodiments of the processes of loan-fund application, set-up, and modification are described with reference to FIGS. 4A-C. These processes are illustrated in a preferred Web-based implementation (using HTML formatted "pages") directed to 401(k) plans; alternative embodiments may retain paper forms or use other input means or access other forms of benefit plans associated with the loan fund of this invention. Many of the first steps illustrated in these figures are preferably implemented by the plan record-keeper system (12 in FIG. 2A) (or other benefit-plan system) because they relate to the benefit plan in general or to the benefit-plan's responsibility to approve employee loan applications. Certain steps that relate primarily to loan-fund administration are carried out by the sub-custodian administration system upon request by the trust record keeper.

First, a participant/prospective participant (participant) logs 70 into the employer benefit systems and accesses 71 a benefits administration page, which preferably presents a menu of possible benefits for further examination including the 401(k) loan fund of this invention. As illustrated, the participant selects an option to establish the 401(k) loan fund 72 of the invention. If the employee is already a 401(k) plan participant, tested at 73, the system presents 74 the 401(k) loan administration logon page. If the participant is not already enrolled, the system inquires 79 whether the employee wishes to join the employer 401(k) benefit plan. If this is the case, the participant is presented with an on-line registration process beginning at registration 80. If the participant does not want to establish a loan fund, then the system allows them to perform other benefit processing 81 and log out.

Optionally, as illustrated, the 401(k) loan fund has login/authentication 74 in addition to the general login/authentication of the main employee-benefits system. If login is successful, tested at 75, the participant is then presented with the actual 401(k) loan-fund creation page 76. If not, the participant is permitted a number of additional login attempts. Loan-fund creation/administration 76 also preferably presents a menu of loan-fund options, including application, modification, queries concerning current fund status and balances, and the like. In subsequent figures actions relating to plan application and management are illustrated. Plan queries may be routinely implemented with data returned from database 21.

If plan application or modification is selected, the participant is next presented with an application or modification detail 77, which may preferably have certain fields, such as participant identification fields in the case of plan application or plan description and status fields in the case of modification, already filled in with information known to the record-keeper system. The participant next enters relevant information 77 and submits 85 to the record-keeper system for data validation and consistency checking 86. In the case of incorrect data 87, the participant is prompted 88 to reenter and resubmit correct data. Correct data is passed to record keeper and trust management systems for processing 89.

Processing of a loan application 90 (equivalently, an application to join the loan-fund benefit option of the 401(k) plan) jointly by the trust record-keeper systems and the sub-custodian administrator systems of the loan plan is illustrated in FIG. 4C. First, the available loan amount (ALA) value is determined 100 by the record-keeper system.

In most cases, the ALA value depends on the vested value of the participant's 401(k) account. Here, database 101 illustrates an exemplary account with several investments. The vested value of these investments is determined by plan vesting rules and the current market values of the investments.

If the participant's requested loan-fund amount (entered in the application page) is equal to or less than the determined ALA value 102, application processing proceeds. If not, the participant is prompted 103 to re-enter a loan-fund amount that is equal to or less then the ALA value provided.

Once an acceptable request has been negotiated with the participant, an investment is created in their benefit-plan account, which is described herein as the loan fund, and is funded by the transfer of assets from previous existing investments within the plan. In database 105, this is indicated by the exemplary record with the "investment—loan fund." For example, this record would result from record-keeper processing of the input account record illustrated in database 101. Assets for acceptance into the loan fund are next provided from the benefit plan to the loan-fund investment management system (24 in FIG. 2A), which carries out actual investment management of the loan-fund accounts (seeking reasonable dividend income consistent with high liquidity and preservation of value). If sufficient cash is not available, fractions of pre-existing investments are liquidated (investments 1-N) and are redeemed 107 and the funds forwarded (40 in FIG. 2B) by the record keeper to the loan-fund manager. At this time, the record keeper also instructs the sub-custodian administrator systems (20 in FIG. 2A) to make necessary preparations for the new loan-fund account, for example, by initializing a database record describing the new participant and the parameters of the associated loan fund, notifying the access vehicles selected by the participant, initializing issuing servicer systems (23 in FIG. 2A) to be ready to process participant transactions, and so forth.

In other words, for each participant benefit-plan account, an ALA value is calculated from their current vested interest in the pension plan and limitations, if any, imposed by statute or regulation or by policies of the benefit-plan sponsor. In view of the determined ALA value, a participant then selects a value for investment in the loan fund to be established, or for modifications to an already established loan fund. If the entire value invested in the loan fund, then the value invested in the loan fund is necessarily equal to the ALA value.

In the case the participant requests modification of an already existing loan-fund account 78, the data entry and validation steps 85, 86, 87, and 88 are performed to validate and consistency check the submitted request. Test 90 and 91 direct modification to steps 92 and 93, which are an abbreviated representation of this processing. Preliminary to 92, negotiation steps, not illustrated but similar to steps 100, 102, and 103 of FIG. 4C, may negotiate with the participant to achieve an acceptable request. Next, the record keeper processes 92 the modification request and provides instructions to the sub-custodian administrator systems to do likewise. As a result of the modification request funds may need to be transferred (40 in FIG. 2B) between the loan-fund investment manager (upon the request of the sub-custodian administrator systems) and the trust (upon request/approval of the trust systems). For example, funds may be transferred from the trust if the participant requests an increased investment in the loan fund; funds may be transferred to the trust if the participant requests a reduced investment in or even total liquidation of the loan fund and reallocation of its assets to other investments in the benefit plan.

From FIGS. 4A-C it can be appreciated that substantial interaction and cooperation, including funds transfer, between the sub-custodian administrator systems, and other closely associated systems, and the trust record-keeper systems, and other trust systems, is needed only when the participant makes macro loan-fund investment decisions. Such loan-fund investment decisions, like most plan investment decisions, are expected to be relatively infrequent (more likely monthly or a few times per year). Further, during these interactions the plan systems of this invention appear to the trust systems largely as just an additional participant investment, managed and reported in already established manners. Accordingly, fashioning this interface is relatively inexpensive, requiring little modification of existing trust or record-keeper systems. Further, the present invention of the loan fund imposes no additional processing burden on the existing trust systems.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior art to the invention of the subject matter claimed herein.

What is claimed is:

1. A computer system for providing loans to a participant having assets in a benefit plan account comprising:

a processor; and a memory operatively coupled to the processor, the memory including program data for causing the processor to perform the steps of:

initializing loan-fund information upon establishment of a loan fund account for the participant which loan fund account is associated with one or more investment vehicles in the benefit plan account, wherein the initializing further comprises funding the loan fund account by investing participant assets in the one or more investment vehicles, wherein the one or more investment vehicles associated with the loan fund account are segregated from other investment vehicles in the benefit plan account, and wherein money is drawn for loans from the loan fund account, wherein the loan fund account is managed by an investment manager, wherein the loan fund account is recorded in the benefit-plan account as an asset;

generating data representing requests to the investment manager to: (i) transfer funds from the loan fund account that is less than a full amount of funds in the loan fund account to settle redemptions made by the participant, the participant making redemptions from the loan fund account by use of at least one access vehicle; or (ii) accept funds into the loan fund account from the participant in repayment of redemptions; and updating said loan-fund information for said loan fund account using a redemption/repayment accounting process associated with the loan fund account that computes a current balance of available funds in the loan fund account based on funds transferred from assets in the loan fund account to settle redemptions and funds accepted as assets into the loan fund account as repayments of redemptions and does not change a loan fund asset amount listed in the account information of the benefit plan account relating to the loan fund account.

2. The computer system of claim 1 further comprising a communication interface for exchanging data between the computer system and a computer system of the investment manager, and wherein the program data further causes the processor to:
   update the loan-fund information upon receipt of data from the investment-manager computer system representing funds transfer from or acceptance into the loan fund account; and
   update the loan-fund information upon receipt of data from the investment-manager computer system representing an accrual of interest into the loan fund account.

3. The computer system of claim 1 further comprising a communication interface for exchanging data between the computer system and a computer system of the benefit plan, and wherein the program data further causes the processor to:
   initialize the loan-fund information upon receipt of data from the benefit-plan computer system representing establishment of the loan-fund; and
   exchange status data with the benefit-plan computer system, wherein the computer system exchanges at least a representation of the current loan-fund balance, and wherein the benefit-plan computer system exchanges at least representation of limitations on the participant's redemptions.

4. The computer system of claim 3 wherein the program data further causes the processor to generate data representing a transfer to the participant's benefit-plan assets of accrued interest paid by the participant on redemptions from the loan fund account.

5. The computer system of claim 3 wherein the program data further causes the processor to generate data representing a transfer to the participant's benefit-plan assets of accrued dividend funds earned on the loan fund account.

6. The computer system of claim 1 further comprising a communication interface for exchanging data between the computer system and a settlement computer system of a settlement system that processes uses of the access vehicle, and
   wherein the program data further causes the processor to generate data representing a request to transfer funds from the loan fund account upon receipt of data from an access-vehicle-settlement computer system representing a request for settlement for the participant's uses of the access vehicle.

7. The computer system of claim 6 wherein the program data further causes the processor to:
   receive data from the access-vehicle-settlement computer system representing a proposed redemption to be made by a participant's proposed use of the access vehicle;
   generate data to the access-vehicle-settlement computer system representing an authorization of the proposed redemption only if the proposed redemption is less than or equal to a line of credit (LOC) value; and
   generate data to the access-vehicle-settlement computer system representing a refusal of the proposed redemption only if the proposed redemption is greater than the LOC value.

8. The computer system of claim 7 wherein the LOC value does not exceed an available loan amount (ALA) value determined in accordance with statute, regulation, or policy in dependence on the participant's benefit-plan assets, wherein the determination preserves a tax-advantaged treatment of the participant's redemptions.

9. The computer system of claim 7 wherein the program data further causes the processor to:
   receive data from the access-vehicle-settlement computer system representing at least one redemption by the participant made by a use of the access vehicle; and
   update data representing the LOC value in response to the received data by decreasing the LOC value by the total value of the redemptions.

10. The computer system of claim 1 further comprising a communication interface for exchanging data between the computer system and a computer system of a funds-acceptance provider, wherein the program data further causes the processor, upon receipt of data from the funds-acceptance-provider computer system representing the participant's payment of funds to the funds-acceptance provider, to generate data representing a request for acceptance of funds into the loan fund account.

11. The system of claim 10 wherein the program data further causes the processor to:
   receive data from funds-acceptance-provider computer system representing at least one re-payment by the participant; and
   update data representing the LOC value in response to the received data by increasing the LOC value by the value of the re-payment.

12. The computer system of claim 1 wherein the access vehicle includes a check, or a credit card, or a debit card, or an ACH transfer, or a wire transfer, or a sweep, or an ATM.

13. The computer system of claim 1 wherein the program data further causes the processor to generate data representing loan-fund statement information for informing the participant of required repayment amounts and times.

14. The computer system of claim 13 wherein the required repayment amounts and times are determined in dependence on the total redemptions that have not yet been repaid and in accordance with statute, regulation, or policy to preserve tax-advantaged treatment of the participant's redemptions.

15. The computer system of claim 13 wherein the generated data is transmitted to the participant by means of the Internet network or a telephone network.

16. The computer system of claim 1 wherein the program data further causes the processor, upon receipt of data representing a participant request, to generate data representing loan-fund status for informing the participant of recent redemptions, or loan-fund balance, or required repayments.

17. The computer system of claim 1 wherein the generated data is periodically transmitted as messages grouped into computer files.

18. A computer-implemented method for providing loans to a participant having assets in a benefit plan comprising:
   initializing loan-fund information upon establishment of a loan fund account for the participant which loan fund account is associated with one or more investment vehicles in the benefit plan account, wherein the initializing further comprises funding the loan fund account by investing participant assets in the one or more investment vehicles, wherein the one or more investment vehicles associated with the loan fund account are segregated from other investment vehicles in the benefit plan account, and wherein money is drawn for loans from the loan fund account, wherein the loan fund account is managed by an investment manager, wherein the loan fund account is recorded in the benefit-plan as an asset;

generating data representing requests to the investment manager to: (i) transfer funds from the loan fund account in an amount that is less than a full amount of funds in the loan fund account to settle redemptions made by the participant by use of at least one access vehicle; or (ii) accept funds into the loan fund account from the participant in repayment of redemptions; and updating said loan-fund information for said loan fund account using a redemption/repayment accounting process associated with the loan fund account that computes a current balance of available funds in the loan fund account based on funds transferred from assets in the loan fund account to settle redemptions and funds accepted as assets into the loan fund account as repayments of redemptions and does not change a loan fund asset amount listed in the account information of the benefit plan account relating to the loan fund account.

19. The computer-implemented method of claim 18, wherein the current loan-fund balance is updated in response to receipt of data from an investment-manager computer system representing funds transfer from or acceptance into the loan fund account.

20. The computer-implemented method of claim 18 further comprising the steps of:

generating data for a benefit-plan computer system representing the current loan-fund balance for the benefit plan; and receiving data from the benefit-plan computer system representing the limitations on the participant's redemptions.

21. The computer-implemented method of claim 18 further comprising a step of generating data representing a request for acceptance of funds into the loan fund account from a funds-acceptance provider in response to receipt of data representing the participant's repayment of funds to the funds-acceptance provider.

22. The computer-implemented method of claim 18 further comprising a step of receiving data representing settlement requests from a settlement system that processes uses of the access vehicle, and wherein data representing requests to transfer funds from the loan fund account to settle redemptions is generated in response to receipt of request data from the access-vehicle-settlement system.

23. The computer-implemented method of claim 22 further comprising the steps of:

receiving data from the access-vehicle-settlement computer system representing at least one redemption by the participant made by a use of the access vehicle; and updating data representing an LOC value in response to the received data by decreasing the LOC value by the total value of the redemptions that have not been repaid.

24. The computer-implemented method of claim 22 further comprising the steps of:

receiving data from the access-vehicle-settlement system representing a proposed redemption to be made by a participant's proposed use of the access vehicle;

generating and sending data to the access-vehicle-settlement system representing an authorization of the proposed redemption only if the proposed redemption is less than or equal to a line of credit (LOC) value; and generating and sending data to the access-vehicle-settlement system representing a refusal of the proposed redemption only if the proposed redemption is greater than the LOC value.

25. The computer-implemented method of claim 24 wherein the LOC value does not exceed an available loan amount (ALA) value determined in accordance with statute, regulation, or policy in dependence on the participant's vested benefit-plan assets, wherein the determination preserves a tax-advantaged treatment of the participant's redemptions.

26. The computer-implemented method of claim 18 wherein the current loan-fund balance is further updated in response to receipt of data from an investment-manager computer system representing a repayment or a fee posted to the loan fund account.

27. The computer-implemented method of claim 18 further comprising a step of generating data representing loan-fund statement information for informing the participant of required repayment amounts and times.

28. The computer-implemented method of claim 27 wherein the required repayment amounts and times are determined in dependence on the total redemptions that have not yet been repaid and in accordance with statute, regulation, or policy to preserve tax-advantaged treatment of the participant's redemptions.

29. The computer-implemented method of claim 18 wherein the access vehicle includes a check, or a credit card, or a debit card, or an ACH transfer, or a wire transfer, or a sweep, or an ATM.

30. The computer-implemented method of claim 18 wherein the generated data is periodically transmitted as messages grouped into computer files.

31. The computer-implemented method of claim 18 wherein loans are provided to a plurality of participants, each participant having assets in the benefit plan.

32. The computer-implemented method of claim 18 further comprising updating the loan-fund information in response to receipt of data from the investment-manager computer system representing posting of (i) interest paid by the participant on redemptions from the loan fund account, or (ii) of dividends earned on the loan fund account.

33. The computer-implemented method of claim 32 further comprising generating data representing a transfer of an interest paid or a dividend earned to the participant's benefit plan assets.

34. A program product comprising:

a computer readable medium having encoded program data capable of, when executed, causing a computer to perform a method for providing loans to a participant having assets in a benefit plan account comprising the steps of:

initializing loan-fund information upon establishment of a loan fund account for the participant which loan fund account is associated with one or more investment vehicles in the benefit plan account, wherein the initializing further comprises funding the loan fund account by investing participant assets in the one or more investment vehicles, wherein the one or more investment vehicles associated with the loan fund account are segregated from other investment vehicles in the benefit plan account, and wherein money is drawn for loans from the loan fund account, wherein the loan fund account is managed by an investment manager, wherein the loan fund account is recorded in the benefit-plan as an asset;

generating data representing requests to the investment manager to: (i) transfer funds from the loan fund account in an amount that is less than a full amount of funds in the loan fund account to settle redemptions made by the participant by use of at least one access vehicle; or (ii) accept funds into the loan fund account from the participant in repayment of redemptions; and updating said loan-fund information for said loan fund account using a redemption/repayment accounting process associated with the loan fund account that computes a current balance of available funds in the loan fund account based on funds transferred from assets in the loan fund account to settle redemptions and funds accepted as assets into the loan fund account as repayments of redemptions and does not change a loan fund asset amount listed in the account information of the benefit plan account relating to the loan fund account.

35. A computer-implemented method for providing loans to a participant having assets in a benefit plan account comprising:

establishing a loan fund account for the participant including the step of storing in a loan fund account in a database by a computer system loan fund information including an account balance of available funds in said loan fund account, wherein the establishing comprises associating the loan fund account with one or more investment vehicles in the benefit plan account, wherein the one or more investment vehicles associated with the loan fund account are segregated from other investment vehicles in the benefit plan account;

transferring participant funds to fund the loan fund account by investing the transferred participant assets in the one or more investment vehicles, and wherein money is drawn for loans from the loan fund account, wherein the loan fund account is managed by an investment manager, wherein the loan fund account is recorded in the benefit-plan account as an asset;

upon request to the investment manager, providing funds from the loan fund account in an amount that is less than a full amount of funds in the loan fund account to settle redemptions made by the participant, the participant making redemptions from the loan fund account by use of at least one access vehicle; and upon request to the investment manager, accepting funds into the loan fund account from the participant in repayment of redemptions;

updating said loan fund information for said loan fund account using a redemption/repayment accounting process associated with the loan fund account that computes a current balance of available funds in the loan fund account based on funds provided from assets in the loan fund account to settle redemptions and funds accepted as assets into the loan fund account in repayment of redemptions and does not change a loan fund asset amount listed in the account information of the benefit plan account relating to the loan fund account.

36. The method of claim 35 further comprises requesting the benefit plan to transfer funds to the loan fund account.

37. The method of claim 35 wherein the value of the funds transferred from the benefit plan is less than the value of participant's vested assets in the benefit plan.

38. The method of claim 35 wherein the participant's benefit-plan assets further comprise a stock, or a bond, or a mutual fund share, or a money market fund share, or a bank deposit, or a financial instrument.

39. The method of claim 35 wherein the access vehicle includes a check, or a credit card, or a debit card, or a wire transfer, or an ACH, or a sweep, or an ATM.

40. The method of claim 35 wherein the participant makes a plurality of redemptions from the loan fund account by a plurality of uses of the access vehicle in a month period.

41. The method of claim 35 further comprising a step of authorizing a participant's proposed redemption from the loan fund account only if the total of the proposed redemption and past redemptions that have not yet been repaid is equal to or less then an available line of credit (LOC) value determined for the participant.

42. The method of claim 41 wherein the LOC value is equal to or less then an available loan amount (ALA) value which depends upon the value of the participant's vested assets in the benefit plan.

43. The method of claim 35 further comprising the steps of:

updating the current loan-fund balance by: (i) increasing the balance upon receipt of funds transferred from the benefit plan or repaid by the participant, and (ii) decreasing the balance upon transferal of funds for settlement of redemptions or transfers to the benefit plan; and sending periodically to the benefit plan information representing the current loan-fund balance.

44. The method of claim 43 wherein the information periodically sent to the benefit plan further represents the value of the amounts due from the participant.

45. The method of claim 35 wherein the loan-fund information is further updated when the investment manager accrues into the loan fund dividends earned on the loan fund account or interest paid by the participant on redemptions from the loan fund account.

46. The method of claim 45 further comprising, upon request to the investment manager, transferring accrued dividend and interest funds from the loan fund account to the benefit plan.

47. The method of claim 35 wherein the steps of establishing, or requesting funds transfer from, or requesting funds acceptance into the loan fund account are performed in accordance with statute, regulation, or policy to preserve tax-advantaged treatment of the participant's redemptions.

48. The method of claim 47 wherein the statute, regulation, or policy includes one or more of the provisions of 26 U.S.C. §§ 1 and 401 et seq., and 29 U.S.C. § 1001 et seq. and any other similar programs.

49. The method of claim 35 wherein, upon establishment, the loan fund account is structured as a sub-custodian or a sub-trust of the benefit plan.

50. A computer system for providing loans to a participant having assets in a benefit plan account comprising:

computer processor means;

computer database means operatively coupled to the computer processor means;

program means for causing the computer processor means to initialize loan-fund information representing a loan-fund balance of available funds upon establishment of a loan fund account for the participant, wherein the loan fund account is associated with one or more investment vehicles in the benefit plan account, wherein the one or more investment vehicles associated with the loan fund account are segregated from other investment vehicles in the benefit plan account, the information initialized in part with data representing the value of funds invested in the one or more investment vehicles associated with the loan fund account, and wherein money is drawn for loans from the loan fund account, wherein the loan fund account is managed by an investment manager and is recorded in the benefit-plan as an asset;

program means for causing the processor means to generate data representing requests to the investment manager to: (i) transfer funds from the loan fund account in an amount that is less than a full amount of funds in the loan fund account to settle redemptions made by the participant; or (ii) accept funds into the loan fund account from the participant in repayment of redemptions; and program means for causing the processor means to update said loan fund information for said loan fund account using a redemption/repayment accounting process associated with the loan fund account that computes a current loan-fund balance of available funds in the loan fund account based on funds transferred from assets in the loan fund account to settle redemptions and funds accepted as assets into the loan fund account as repayments of redemptions and does not change the loan fund asset amount listed in the account information of the benefit plan account relating to the loan fund account.

51. The computer system of claim 50 further comprising:
program means for causing the processor means to generate data for the benefit-plan computer system representing the current loan-fund balance for the benefit plan, and
program means for causing the processor means to receive data from the benefit-plan computer system representing limitations on the participant's redemptions.

52. The computer system of claim 50 further comprising program means for causing the processor means to generate data representing a request for acceptance of funds into the loan fund account from a funds-acceptance provider in response to receipt of data representing the participant's repayment of funds to the funds-acceptance provider.

53. The computer system of claim 50 further comprising program means for causing the processor means to receive data representing settlement requests from a settlement system that processes uses of an access vehicle, and wherein data representing requests to transfer funds from the loan fund account to settle redemptions is generated in response to receipt of request data from the access-vehicle-settlement system.

54. The computer system of claim 53 further comprising:
program means for causing the processor means to receive data from an access-vehicle-settlement computer system representing at least one redemption by the participant made by a use of the access vehicle; and
program means for causing the processor means to update data representing an LOC value in response to the received data by decreasing the LOC value by the total value of the redemptions that have not been repaid.

55. The computer system of claim 53 further comprising:
program means for causing the processor means to receive data from the access-vehicle-settlement system representing a proposed redemption to be made by a participant's proposed use of the access vehicle;
program means for causing the processor means to generate data to the access-vehicle-settlement system representing an authorization of the proposed redemption only if the proposed redemption is less than or equal to a line of credit (LOC) value; and
program means for causing the processor means to generate data to the access-vehicle-settlement system representing a refusal of the proposed redemption only if the proposed redemption is greater than the LOC value.

56. The computer system of claim 50 further comprising program means for causing the processor means to generate data representing loan-fund statement for informing the participant of required repayment amounts and times.

57. A computer system for providing loans to a participant having assets in a benefit plan account, said benefit plan account of said participant comprising a plurality of investment vehicles, said computer system comprising at least one processor; and
a computer-readable memory operatively connected to the at least one processor, with instructions capable of performing steps comprising:
maintaining a loan fund account associated with one or more of the investment vehicles in the benefit plan account and funded by participant assets invested in the one or more investment vehicles, wherein the one or more investment vehicles associated with the loan fund account are segregated from other investment vehicles in the benefit plan account, and wherein money is drawn for loans from the loan fund account;
receiving information reflecting a loan request for a loan-request amount of funds made by said participant from the loan fund account;
verifying that said loan-request amount does not exceed an amount related to a current balance of available funds in said loan fund account using account information for said loan fund account;
initiating transfer of said amount of funds requested by said participant loan request from said loan fund if said loan-request amount has been verified to not exceed said amount related to the current balance of available funds in said loan fund account, said amount of funds transferred being less than a full amount of funds in the loan fund account; and
updating said account information for said loan fund account to reflect said loan-request amount of funds transferred from said loan fund account using a redemption/repayment accounting process associated with the loan fund account that computes a current balance of available funds in the loan fund account based on redemptions and payments from the amount of assets in the loan fund account and does not change a loan fund asset amount listed in the account information of the benefit plan account relating to the loan fund account.

58. The computer system of claim 57 wherein said loan fund account comprises substantially constant face value assets having a stable market value.

59. The computer system of claim 58 wherein said substantially constant face value assets comprise cash or cash-equivalent instruments.

60. The computer system of claim 57 further performing steps comprising:
receiving information reflecting a repayment made by said participant;
transferring an amount of funds repaid by said participant into said loan fund account; and
updating said account information for said loan fund account that is to reflect said amount of repaid funds transferred into said loan fund account.

61. The computer system of claim 57 further performing steps comprising:
receiving information reflecting a request made by said participant to transfer an amount of funds into said loan fund account from said benefit plan account;

transferring said amount of funds requested by said participant transfer request into said loan fund account from said benefit plan account; and updating said account information for said loan fund account to reflect said amount of funds transferred into said loan fund account.

62. The computer system of claim 61, wherein the receiving information reflecting a request made by said participant to transfer step comprises receiving an electronic request from a computer of an investment manager.

63. The computer system of claim 57 further performing steps comprising:

receiving information reflecting a request made by said participant to transfer an amount of funds from said loan fund account into other investment vehicles in said benefit plan account;

transferring said amount of funds requested by said participant transfer request from said loan fund account into other investment vehicles in said benefit plan account; and updating said account information for said loan fund account to reflect said amount of funds transferred from said loan fund account.

64. The computer system of claim 63, wherein the receiving information reflecting a request made by said participant to transfer step comprises receiving an electronic request from a computer of an investment manager.

65. The computer system of claim 57 wherein at least one loan request is made by use of a payment access vehicle by said participant.

66. The computer system of claim 65 wherein said payment access vehicle comprises a check, or a credit card, or a debit card, or an ACH transfer, or a wire transfer, or a sweep, or an ATM.

67. The computer system of claim 57 further performing steps comprising administering said benefit plan account by updating in said account information for said benefit plan a value of said investment in said loan fund account listed for said benefit plan account, said updated value reflecting said current balance of available funds in said loan fund account.

68. The computer system of claim 57 further performing steps comprising updating said account information for said loan fund account to reflect accrual of interest into said loan fund account.

69. The computer system of claim 57 further performing steps comprising receiving, from an administrator/processor of said benefit plan account, information reflecting a maximum total amount of loans from said loan fund account that can be outstanding to said participant, wherein said maximum amount of loans is determined in dependence on a current value of said assets in said benefit plan account.

70. The computer system of claim 69 further performing steps comprising determining an available line of credit for said loan fund account, said available line of credit not exceeding either said maximum amount of loans or said current balance of available funds in said loan fund account.

71. The computer system of claim 70 wherein said step of verifying further comprises verifying that said loan-request amount does not exceed said available line of credit.

72. The computer system of claim 70 wherein said step of updating further comprises updating said available line of credit to reflect said amount of funds transferred from said loan fund account.

73. The computer system of claim 57 wherein said step of receiving further comprises receiving information from a payment-settlement system reflecting at least one loan-request; and wherein the loan-request amount of said loan request reflects payments made or to be made by said payment-settlement system consequent to a use or to uses of a payment access vehicle by said participant.

74. The computer system of claim 73 further performing steps comprising:

receiving information from said payment settlement system reflecting at least one proposed use of said payment access vehicle by said participant; and sending information to the payment settlement system reflecting approval/rejection of said proposed use if the amount of said proposed use is less than/greater than an available line of credit for said loan fund account.

75. The computer system of claim 57 further performing steps comprising transmitting information reflecting said current balance of available funds in said loan fund account to an administrator of said benefit plan account.

76. The computer system of claim 57 wherein there are a plurality of different benefit plans, each different benefit plan for a different employer and having different rules on granting loan, and wherein a separate storage for the loan fund account further stores the different rules indexed by benefit plan.

77. The computer system of claim 57 further comprising computer instructions for an interface to the World Wide Web which is accessed by a participant to send a signal initiating transfer of assets between the loan fund account and the benefit plan account.

78. The computer system of claim 57, further comprising computer instructions for receiving income information from an investment of all or a portion of the loan fund account that has not been loaned; and generating and sending a signal with at least a portion of the income information to update account information for said benefit plan account.

79. The computer system of claim 57, wherein said account information for said loan fund account is stored in a different electronic database relative to said account information for said benefit plan account.

80. The computer system of claim 57, wherein the benefit plan account is a 401K or other contributory plan.

81. A computer system for providing loans to a participant having assets in a benefit plan account, said benefit plan account of said participant comprising a plurality of investment vehicles, said computer system comprising:

at least one processor; and a computer-readable memory operatively connected to the at least one processor, with instructions capable of performing steps comprising:

computing using a redemption/repayment accounting process associated with the loan fund account a current balance of available funds in a loan fund account based on redemptions from and payments to the loan fund account, wherein the loan fund account is associated with one or more of the investment vehicles in the benefit plan account and funded by participant assets invested in the one or more investment vehicles, wherein the one or more investment vehicles associated with the loan fund account are segregated from other investment vehicles in the benefit plan account, and wherein money is drawn for loans from the loan fund account in an amount that is less than a full amount of funds in the loan fund account, wherein the loan fund account is recorded in the benefit plan account as an asset, wherein the accounting process does not change a loan fund asset amount listed in the account information of the benefit plan account relating to the loan fund account;

receiving information reflecting a loan request for a loan-request amount of funds made by said participant from the loan fund account;

verifying that said loan-request amount does not exceed an amount related to the current balance of available funds in said loan fund account using said account information for said loan fund account; and sending information reflecting rejection of said loan request if said loan request has not been verified because said loan-request amount exceeds said amount related to the current balance of available funds in said loan fund account for the loan request.

82. The computer system of claim 81 wherein said loan fund account comprises substantially constant face value assets having a stable market value.

83. The computer system of claim 82 wherein said stable-value assets comprise cash or cash-equivalent instruments.

84. The computer system of claim 81 further performing steps comprising:

receiving information reflecting a repayment made by said participant;

transferring the amount of funds repaid by said participant into said loan fund account; and updating said account information for said loan fund account account to reflect said amount of repaid funds transferred into said loan fund account.

85. The computer system of claim 81 further performing steps comprising:

receiving information reflecting a request made by said participant to transfer an amount of funds into said loan fund account from said benefit plan account;

transferring said amount of funds requested by said participant transfer request into said loan fund account from said benefit plan account; and updating said account information for said loan fund account to reflect said amount of funds transferred into said loan fund account.

86. The computer system of claim 85, wherein the receiving information reflecting a request made by said participant to transfer step comprises receiving an electronic request from a computer of an investment manager.

87. The computer system of claim 81 further performing steps comprising:

receiving information reflecting a request made by said participant to transfer an amount of funds from said loan fund account into other investment vehicles in said benefit plan account;

transferring said amount of funds requested by said participant transfer request from said loan fund account into other investment vehicles in said benefit plan account; and updating said account information for said loan fund account to reflect said amount of funds transferred from said loan fund account.

88. The computer system of claim 87, wherein the receiving information reflecting a request made by said participant to transfer step comprises receiving an electronic request from a computer of an investment manager.

89. The computer system of claim 81 wherein at least one loan request is made by use of a payment access vehicle by said participant.

90. The computer system of claim 89 wherein said payment access vehicle comprises a check, or a credit card, or a debit card, or an ACH transfer, or a wire transfer, or a sweep, or an ATM.

91. The computer system of claim 81 further performing steps comprising administering said benefit plan account by updating in said account information for said benefit plan the value of said investment in said loan fund account listed for the benefit plan account, said updated value reflecting said current balance of available funds in said loan fund account.

92. The computer system of claim 81 further performing steps comprising updating said account information for said loan fund account to reflect accrual of interest into said loan fund account.

93. The computer system of claim 81 further performing steps comprising receiving, from an administrator/processor of said benefit plan account, information reflecting a maximum total amount of loans from said loan fund account that can be outstanding to said participant, wherein said maximum amount of loans is determined in dependence on a current value of said assets in said benefit plan account.

94. The computer system of claim 93 further performing steps comprising determining an available line of credit for said loan fund account, said available line of credit not exceeding either said maximum amount of loans or said current balance of available funds in said loan fund account.

95. The computer system of claim 94 wherein said step of verifying further comprises verifying that said loan-request amount does not exceed said available line of credit; and wherein said step of sending further sends information reflecting rejection of said loan request if said loan request has not been verified because said loan request amount exceeds said available line of credit.

96. The computer system of claim 81 wherein said step of receiving further comprises receiving information from a payment-settlement system reflecting at least one loan-request; and wherein the loan-request amount of said loan request reflects payments made or to be made by said payment-settlement system consequent to a use or to uses of a payment access vehicle by said participant.

97. The computer system of claim 96 further performing steps comprising:

receiving information from said payment settlement system reflecting at least one proposed use of said payment access vehicle by said participant; and sending information to the payment settlement system reflecting approval/rejection of said proposed use if the amount of said proposed use is less than/greater than available line of credit for said loan fund account.

98. The computer system of claim 81 further performing steps comprising transmitting information reflecting said current balance of available funds in said loan fund account to an administrator of said benefit plan account.

99. The computer system of claim 81, wherein there are a plurality of different benefit plans, each different benefit plan for a different employer and having different rules on granting loan, and wherein separate storage for the loan fund account further stores the different rules indexed by benefit plan.

100. The computer system of claim 81, further comprising computer instructions for an interface to the World Wide Web which is accessed by a participant to send a signal initiating transfer of assets between the loan fund account and the benefit plan account.

101. The computer system of claim 81, further comprising computer instructions for
   receiving income information from an investment of all or a portion of the loan fund account that has not been loaned; and
   generating and sending a signal with at least a portion of the income information to update account information for said benefit plan account.

102. The computer system of claim 81, wherein said account information for said loan fund account is stored in a different electronic database relative to said account information for said benefit plan account.

103. The computer system of claim 81, wherein the benefit plan account is a 401K or other contributory plan.

* * * * *

UNITED STATES PATENT AND TRADEMARK OFFICE
CERTIFICATE OF CORRECTION

PATENT NO. : 7,302,413 B1 Page 1 of 1
APPLICATION NO. : 10/092279
DATED : November 27, 2007
INVENTOR(S) : Bruce Bent, Bruce Bent, II and Mark Vernaglia It is certified that error appears in the above-identified patent and that said Letters Patent is hereby corrected as shown below:

ON THE TITLE PAGE:

(73) Assignee: Delete "Reserve Management Corporation" and replace it with

--Reserve Solutions, Inc.--.

Signed and Sealed this

Eighteenth Day of November, 2008

JON W. DUDAS
*Director of the United States Patent and Trademark Office*